(12) United States Patent
Cervera et al.

(10) Patent No.: US 8,013,580 B2
(45) Date of Patent: *Sep. 6, 2011

(54) CONTROLLER FOR A POWER CONVERTER AND METHOD OF OPERATING THE SAME

(75) Inventors: Pedro Alou Cervera, Madrid (ES); Jose Antonio Cobos Márquez, Madrid (ES); Ashraf W. Lotfi, Bridgewater, NJ (US); Andrés Soto del Pecho, Madrid (ES)

(73) Assignee: Enpirion, Inc., Hampton, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/425,175

(22) Filed: Apr. 16, 2009

(65) Prior Publication Data

US 2009/0212751 A1    Aug. 27, 2009

Related U.S. Application Data

(63) Continuation of application No. 11/368,559, filed on Mar. 6, 2006, now Pat. No. 7,521,907.

(51) Int. Cl.
*G05F 1/40* (2006.01)

(52) U.S. Cl. ........ 323/268; 323/273; 323/275; 323/282; 323/285

(58) Field of Classification Search .................. 323/222, 323/225, 273–277, 280, 283–286, 268
See application file for complete search history.

(56) References Cited

U.S. PATENT DOCUMENTS

| | | |
|---|---|---|
| 4,016,461 A | 4/1977 | Roland |
| 4,654,770 A | 3/1987 | Santurtûn et al. |
| 4,761,725 A | 8/1988 | Henze |
| 4,801,816 A | 1/1989 | Merlo et al. |
| 4,912,622 A | 3/1990 | Steigerwald et al. |
| 4,982,353 A | 1/1991 | Jacob et al. |
| 5,245,228 A | 9/1993 | Harter |
| 5,258,662 A | 11/1993 | Skovmand |
| 5,285,369 A | 2/1994 | Balakrishnan |
| 5,371,415 A | 12/1994 | Dixon et al. |
| 5,414,341 A | 5/1995 | Brown |
| 5,469,334 A | 11/1995 | Balakrishnan |
| 5,510,739 A | 4/1996 | Caravella et al. |
| 5,541,541 A | 7/1996 | Salamina et al. |
| 5,548,206 A | 8/1996 | Soo |

(Continued)

OTHER PUBLICATIONS

Barrado, A., et al., "New DC/DC Converter with Low Output Voltage and Fast Transient Response," Proceedings of the IEEE Applied Power Electronics Conference, 2003, pp. 432-437, IEEE, Los Alamitos, CA.

(Continued)

*Primary Examiner* — Jessica Han
(74) *Attorney, Agent, or Firm* — Slater & Matsil, L.L.P.

(57) ABSTRACT

A controller for use with a power converter including a switch configured to conduct to provide a regulated output characteristic at an output of the power converter, and method of operating the same. In one embodiment, the controller includes a linear control circuit, coupled to the output, configured to provide a first control signal for the switch as a function of the output characteristic. The controller also includes a nonlinear control circuit, coupled to the output, configured to provide a second control signal for the switch as a function of the output characteristic. The controller is configured to select one of the first and second control signals for the switch in response to a change in an operating condition of the power converter.

20 Claims, 12 Drawing Sheets

U.S. PATENT DOCUMENTS

| | | | |
|---|---|---|---|
| 5,568,044 A | 10/1996 | Bittner | |
| 5,592,072 A * | 1/1997 | Brown | 323/268 |
| 5,594,324 A | 1/1997 | Canter et al. | |
| 5,625,312 A | 4/1997 | Kawakami et al. | |
| 5,689,213 A | 11/1997 | Sher | |
| 5,796,276 A | 8/1998 | Phillips et al. | |
| 5,864,225 A | 1/1999 | Bryson | |
| 5,877,611 A | 3/1999 | Brkovic | |
| 5,912,589 A | 6/1999 | Khoury et al. | |
| 5,977,811 A | 11/1999 | Maguzzú | |
| 6,005,377 A | 12/1999 | Chen et al. | |
| 6,118,351 A | 9/2000 | Kossives et al. | |
| 6,169,433 B1 | 1/2001 | Farrenkopf | |
| 6,201,429 B1 | 3/2001 | Rosenthal | |
| 6,211,706 B1 | 4/2001 | Choi et al. | |
| 6,222,403 B1 | 4/2001 | Mitsuda | |
| 6,255,714 B1 | 7/2001 | Kossives et al. | |
| 6,262,564 B1 | 7/2001 | Kanamori | |
| 6,285,209 B1 | 9/2001 | Sawai | |
| 6,285,539 B1 | 9/2001 | Kashimoto et al. | |
| 6,320,449 B1 | 11/2001 | Capici et al. | |
| 6,388,468 B1 | 5/2002 | Li | |
| 6,407,579 B1 | 6/2002 | Goswick | |
| 6,407,594 B1 | 6/2002 | Milazzo et al. | |
| 6,452,368 B1 * | 9/2002 | Basso et al. | 323/282 |
| 6,477,065 B2 | 11/2002 | Parks | |
| 6,495,019 B1 | 12/2002 | Filas et al. | |
| 6,541,819 B2 | 4/2003 | Lotfi et al. | |
| 6,570,413 B1 | 5/2003 | Kumagai et al. | |
| 6,573,694 B2 | 6/2003 | Pulkin et al. | |
| 6,580,258 B2 | 6/2003 | Wilcox et al. | |
| 6,639,427 B2 | 10/2003 | Dray et al. | |
| 6,650,169 B2 | 11/2003 | Faye et al. | |
| 6,661,216 B1 | 12/2003 | Grant et al. | |
| 6,759,836 B1 | 7/2004 | Black, Jr. | |
| 6,791,305 B2 | 9/2004 | Imai et al. | |
| 6,822,882 B1 | 11/2004 | Jacobs et al. | |
| 6,828,825 B2 | 12/2004 | Johnson et al. | |
| 6,879,137 B2 | 4/2005 | Sase et al. | |
| 6,922,044 B2 | 7/2005 | Walters et al. | |
| 6,984,968 B2 * | 1/2006 | Moon | 323/282 |
| 7,015,544 B2 | 3/2006 | Lotfi et al. | |
| 7,019,505 B2 | 3/2006 | Dwarakanath et al. | |
| 7,038,438 B2 | 5/2006 | Dwarakanath et al. | |
| 7,038,514 B2 | 5/2006 | Leith et al. | |
| 7,061,217 B2 | 6/2006 | Bayer et al. | |
| 7,148,670 B2 * | 12/2006 | Inn et al. | 323/283 |
| 7,190,150 B2 * | 3/2007 | Chen et al. | 323/222 |
| 7,214,985 B2 | 5/2007 | Lotfi et al. | |
| 7,230,302 B2 | 6/2007 | Lotfi et al. | |
| 7,319,311 B2 * | 1/2008 | Nishida | 323/284 |
| 7,330,017 B2 | 2/2008 | Dwarakanath et al. | |
| 7,352,162 B1 | 4/2008 | Chang et al. | |
| 7,482,795 B2 | 1/2009 | Parto et al. | |
| 7,482,796 B2 | 1/2009 | Nishida | |
| 7,501,805 B2 | 3/2009 | Chen et al. | |
| 7,521,907 B2 * | 4/2009 | Cervera et al. | 323/268 |
| 7,679,342 B2 | 3/2010 | Lopata et al. | |
| 7,710,093 B2 | 5/2010 | Dwarakanath et al. | |
| 7,714,558 B2 | 5/2010 | Wu | |
| 7,728,573 B2 | 6/2010 | Capilla et al. | |
| 7,733,072 B2 | 6/2010 | Kanakubo | |
| 2002/0175661 A1 | 11/2002 | Wheeler et al. | |
| 2004/0169498 A1 | 9/2004 | Goder et al. | |
| 2005/0046405 A1 | 3/2005 | Trafton et al. | |
| 2005/0088216 A1 | 4/2005 | Arndt et al. | |
| 2005/0167756 A1 | 8/2005 | Lotfi et al. | |
| 2005/0168203 A1 | 8/2005 | Dwarakanath et al. | |
| 2005/0168205 A1 | 8/2005 | Dwarakanath et al. | |
| 2005/0169024 A1 | 8/2005 | Dwarakanath et al. | |
| 2006/0038225 A1 | 2/2006 | Lotfi et al. | |
| 2006/0132217 A1 | 6/2006 | Lou et al. | |
| 2008/0018366 A1 | 1/2008 | Hanna | |
| 2008/0094114 A1 | 4/2008 | Dwarakanath et al. | |
| 2008/0106246 A1 | 5/2008 | Dwarakanath et al. | |
| 2009/0167267 A1 | 7/2009 | Dwarakanath et al. | |
| 2009/0261791 A1 | 10/2009 | Lopata et al. | |

OTHER PUBLICATIONS

Betancourt-Zamora, R.J. et al., "A 1.5 mW, 200 MHz CMOS VCO for Wireless Biotelemetry," First International Workshop on Design of Mixed-Mode Integrated Circuits and Applications, Jul. 1997, pp. 72-74, Cancun, Mexico.

Goder, D., et al., "V2 Architecture Provides Ultra-Fast Transient Response in Switch Mode Power Supplies," Proceedings of HFPC Power Conversion, 1996, pp. 414-420.

Goodman, J. et al., "An Energy/Security Scalable Encryption Processor Using an Embedded Variable Voltage DC/DC Converter," IEEE Journal of Solid-State Circuits, Nov. 1998, vol. 33, No. 11, IEEE, Los Alamitos, CA.

Horowitz, P., et al., "The Art of Electronics," Second Edition, 1989, pp. 288-291, Cambridge University Press, Cambridge, MA.

"Linear Technology: LTC3736-1: Dual 2-Phase, No RSENSETM, Synchronous Controller with Spread Spectrum," 2004, 28 pp., Linear Technology Corporation, Milpitas, CA.

Lotfi, A.W., et al., "Issues and Advances in High-Frequency Magnetics for Switching Power Supplies," Proceedings of the IEEE, Jun. 2001, vol. 89, No. 6, pp. 833-845, IEEE, Los Alamitos, CA.

Patella, B.J., et al., "High-Frequency Digital Controller IC for DC/DC Converters," IEEE Proceedings of the Applied Power Electronics Conference, Mar. 10, 2002, 7 pp., IEEE, Los Alamitos, CA.

Peterchev, A.V., et al., "Quantization Resolution and Limit Cycling in Digitally Controlled PWM Converters," IEEE Transactions on Power Electronics, Jan. 2003, pp. 301-303, vol. 18, No. 1, IEEE, Los Alamitos, CA.

Redl, R., et al.,"Optimizing the Load Transient Response of the Buck Converter," Proceedings of the IEEE Applied Power Electronics Conference, 1998, pp. 170-176, IEEE, Los Alamitos, CA.

Schoneman, G.K., et al., "Output Impedance Considerations for Switching Regulators with Current-Injected Control," Proceedings of the 18th Annual IEEE Power Electronics Specialists Conference, Jun. 1987, pp. 324-335, IEEE, Los Alamitos, CA.

Soto, A., et al. "Analysis of the Buck Converter for Scaling the Supply Voltage of Digital Circuits," Proceedings of the IEEE Applied Power Electronics Conference, 2003, pp. 711-717, IEEE, Los Alamitos, CA.

Soto, A., et al., "Design Methodology for Dynamic Voltage Scaling in the Buck Converter," Proceedings of the IEEE Applied Power Electronics Conference, 2005, pp. 263-269, IEEE, Los Alamitos, CA.

"TPS40100: Midrange Input Synchronous Buck Controller with Advanced Sequencing and Output Margining," May 2005, 37 pp., Texas Instruments Incorporated, Dallas, TX.

Zhou, X., et al., "Improved Light-Load Efficiency for Synchronous Rectifier Voltage Regulation Module," IEEE Transactions on Power Electronics, Sep. 2000, pp. 826-834, vol. 15, No. 5, IEEE, Los Alamitos, CA.

* cited by examiner

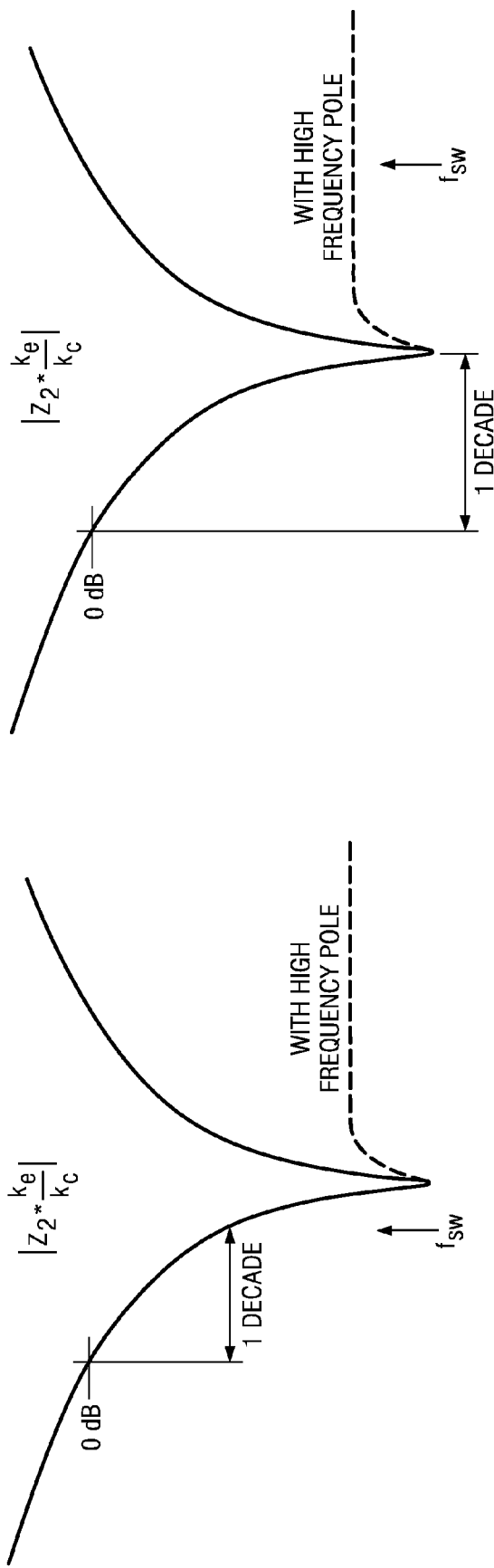
FIG. 9B
FIG. 9A
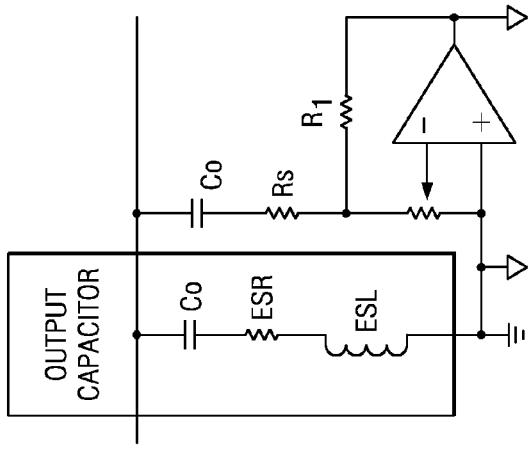
FIG. 13

CONTROLLER FOR A POWER CONVERTER AND METHOD OF OPERATING THE SAME

This application is a continuation of U.S. patent application Ser. No. 11/368,559, entitled "Controller for a Power Converter and a Method of Operating the Same," filed on Mar. 6, 2006 (now U.S. Pat. No. 7,521,907), which application is incorporated herein by reference.

TECHNICAL FIELD

The present invention is directed, in general, to power electronics and, in particular, to a controller for a power converter and method of operating the same.

BACKGROUND

A switch mode power converter (also referred to as a "power converter") is a power supply or power processing circuit that converts an input voltage waveform into a specified output voltage waveform. Controllers associated with power converters manage an operation thereof by controlling the conduction periods of switches employed therein. Generally, controllers are coupled between an input and output of the power converter in a feedback loop configuration (also referred to as a "control loop" or "closed control loop").

Typically, the controller measures an output characteristic (e.g., an output voltage) of the power converter and based thereon modifies a duty cycle of the switches of the power converter. The duty cycle is a ratio represented by a conduction period of a switch to a switching period thereof. Thus, if a switch conducts for half of the switching period, the duty cycle for the switch would be 0.5 (or 50 percent). Additionally, as the needs for systems such as microprocessors powered by the power converter dynamically change (e.g., as a computational load on the microprocessor changes), the controller is typically configured to dynamically increase or decrease the duty cycle of the switches therein to maintain the output characteristic at a desired value.

As discussed above, power converters are frequently employed to power loads having tight regulation characteristics such as a microprocessor with, for instance, five volts provided from a source of electrical power (e.g., a voltage source). To provide the voltage conversion and regulation functions, the power converters include switches such as metal-oxide semiconductor field-effect transistors ("MOSFETs") that are coupled to the voltage source and periodically switch a reactive circuit element such as an inductor to the voltage source at a switching frequency that may be on the order of a half megahertz ("MHz") or higher. To maintain high power conversion efficiency and low cost, the switching frequency of the power converter is generally limited to a value dependent on characteristics of the switches.

As the performance of microprocessors continues to increase with continuing improvements in silicon technology, new demands are placed on the power converters that power the microprocessors. The power absorbed by a microprocessor, and generally any digital system implemented with complementary metal-oxide semiconductor ("CMOS") technology, is substantially proportional to a clock frequency and to a square of an operating voltage thereof. Thus, new digital system designs including microprocessors are pressed to operate at a low supply voltage and low clock frequency in view of a digital workload that may vary dynamically over time.

A newer consideration associated with the use of power converters employed with digital systems is the need to quickly respond to step changes in the output current (also, the load current) when the digital system enters a halt or idle state or, alternatively, when the digital system resumes its normal high performance workload. For example, the output current absorbed by a high performance microprocessor can change as fast as 1000 amperes per microsecond ("A/µs") with little or no tolerance to forego a tight output voltage regulation limit [such as ±200 millivolts ("mVs") for a 1.5 volt output].

Another new demand is the need for the power converter to quickly and controllably change the regulated output voltage without voltage overshoots as the microprocessor responds to the dynamic changes in the digital workload. Reducing the supply voltage when the digital workload is reduced accommodates a reduction in microprocessor clock frequency, which proportionately reduces power dissipation. Ideally, the output voltage of the power converter is changed in a sufficiently controlled and predictable manner so that a clock of the microprocessor can continue to operate during the voltage transition. Changing output voltage for a dynamically changing microprocessor workload is referred to as dynamic voltage scaling ("DVS"), which is a technique that dramatically reduces energy consumption in high performance digital systems.

The power converter is thus an essential element for achieving a substantial reduction in energy consumption associated with digital systems. The power converter is measured by its response time to the changes, resulting in closely watched performance metrics for market acceptance. A power converter should continue to maintain tight output voltage regulation limits in response to normal changes in environmental conditions (e.g., input voltage and temperature variations), while producing a substantially dc output voltage with tightly specified ripple content such as ripple voltage, current or frequency. The power converter should also perform the power conversion tasks with little or no reduction in power conversion efficiency.

Analog linear controllers have traditionally been used to control an output characteristic of a power converter such as an output voltage. A recognized disadvantage of analog linear controllers is the limited dynamic response time. The bandwidth of an analog linear controller for a power converter, which exhibits an inverse relationship with the output voltage response time and the output current transition times, is typically limited to approximately one-fifth to one-tenth of a switching frequency of the power converter to achieve the necessary gain and phase margins for stability in the control loop. The power converters with higher switching frequencies can achieve faster response times and produce lower output ripple voltages, but often incur a reduction in power conversion efficiency and in physical density produced by increased switching losses in the semiconductor devices, by skin effect in various conductors, and by increased losses in magnetic cores of the magnetic devices therein. The optimal switching frequency from a perspective of a power converter response time is generally substantially higher than the optimal switching frequency from a perspective of power conversion efficiency. Thus, an optimum linear controller designed for a power converter with a switching frequency of 500 kilohertz ("kHz") cannot achieve a two µs output voltage transition because the control system bandwidth is also 500 kHz, which is not practical with an approach using a linear controller.

Various design approaches to power converter design have been attempted to meet the difficult and interacting choices. One design approach uses sufficiently fast switches to achieve higher efficiency and small size with a switching frequency over five MHz. Theoretically, linear controllers can handle control bandwidths approaching one MHz. However, it is quite difficult to provide control robustness for the power converter because of noise, plant variations, parasitic influences, and non-ideal error amplifiers. Another design approach uses multiple interleaved power trains (which include switch(es) of the power converter) to produce a higher effective output ripple frequency that can be more easily filtered with a small output capacitor and that accommodates wider control bandwidth. Interleaved power trains generally allow the efficient use of smaller output filter components, particularly output inductors, which are necessary to achieve fast output voltage and current response times. Even if a high switching frequency and interleaved power trains are used, however, sufficient control bandwidth and response times are generally impractical with a linear controller.

To reduce the response time for the output of a power converter employing a buck topology to a desired state (particularly for step changes in the output voltage), Pontryagin's principle has been used to generate an ideal control signal to transition the output state of a power converter in minimum period of time. A control law and experimental results using this approach are described by A. Soto, et al. in "Analysis of the Buck Converter for Scaling the Supply Voltage of Digital Circuits," published in the Proceedings of the IEEE Applied Power Electronics Conference, pp. 711-717, 2003, which is incorporated herein by reference. In the aforementioned reference, control of the conduction and non-conduction periods for the high frequency switches in the power converter with an intermediate switching transition is described that achieves a minimum response time.

Digital control approaches to power converters have also been introduced in the past. There are certain applications in which digital control is more advantageous than analog control, particularly in the ability to introduce nonlinear elements in the control process. The idea of introducing nonlinear control has also been explored by D. Goder, et al. ("Goder"), in "$V^2$ Architecture Provides Ultra-Fast Transient Response in Switch Mode Power Supplies," published in the Proceedings of HFPC Power Conversion, pp. 414-420, 1996, and by A. Barrado, et al., in "New DC-DC Converter with Low Output Voltage and Fast Transient Response," published in the Proceedings of the IEEE Applied Power Electronics Conference, pp. 432-437, 2003, which are incorporated herein by reference. Nonlinear control is employed to provide a fast transient response for the power converter without relying on a linear high bandwidth control for large step changes in the output current or in step changes in the reference voltage for the output voltage set point. On the other hand, slower linear control combined with nonlinear control can provide accurate steady-state output voltage regulation for slower power converter perturbations such as input voltage variation, temperature drift, and component aging.

The use of digital control, particularly including linear and nonlinear control, has to address two main problems. First, the nonlinear response should accommodate, without interference, steady-state output voltage regulation with acceptable accuracy. Otherwise, the fast transient response will still be substantially affected by the slower linear loop. Second, the slower linear loop should not interfere with the nonlinear response in a way that leads to instabilities in an overall control of the power converter.

Well known nonlinear strategies such as $V^2$ control as described by Goder or the use of hysteretic control methods have attempted to address these issues. A remaining problem, however, is the introduction of significant noise in the control loop as system bandwidth is increased. Both strategies sense the output ripple voltage, which is very small compared to its dc value. The output ripple voltage, which is generally a triangular waveform, is determined by the effective series resistance ("ESR") of the output capacitors (or of an added resistor) and is generally present, as described by R. Redl, et al. ("Redl"), in "Optimizing the Load Transient Response of the Buck Converter," published in the Proceedings of the IEEE Applied Power Electronics Conference, pp. 170-176, 1998, which is incorporated herein by reference. Sensing output ripple voltage often worsens output voltage regulation, particularly for step load changes. The transient response of the control loop for step changes in the output voltage becomes very aggressive since the controller attempts to correct the output voltage error in one switching action, which may be faster than a minimum time. The output inductor current does not settle at the end of a transient and the magnitude thereof should be limited during a voltage step to prevent inductor saturation.

Accordingly, what is needed in the art is a controller and method of operating a power converter that can provide fast response times to a step change in an output characteristic (e.g., output voltage) as well as maintain output voltage regulation with close tolerance during a step change in the output current. Tight control of the output voltage during steady-state operation should be maintained with limited response to noise in the control loop. Conventional controllers are substantially susceptible to noise when expanding a bandwidth of the control loop to a sufficient level to provide fast output voltage control without unnecessary voltage overshoot or control loop stability margins. A number of attempts have been made to meet the design objectives without avail.

SUMMARY OF THE INVENTION

These and other problems are generally solved or circumvented, and technical advantages are generally achieved, by advantageous embodiments of a controller for use with a power converter including a switch configured to conduct to provide a regulated output characteristic at an output of the power converter, and method of operating the same. In one embodiment, the controller includes a linear control circuit, coupled to the output, configured to provide a first control signal for the switch as a function of the output characteristic. The controller also includes a nonlinear control circuit, coupled to the output, configured to provide a second control signal for the switch as a function of the output characteristic. The controller is configured to select one of the first and second control signals for the switch in response to a change in an operating condition of the power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIGS. 8 to 10 illustrate diagrams of equivalent circuit models and waveform diagrams demonstrating an operation of embodiments of a controller in accordance with the principles of the present invention;

FIGS. 12 and 13 illustrate diagrams of embodiments of sensing circuits that measure currents of a capacitor according to the principles of the present invention.

Figure 1:
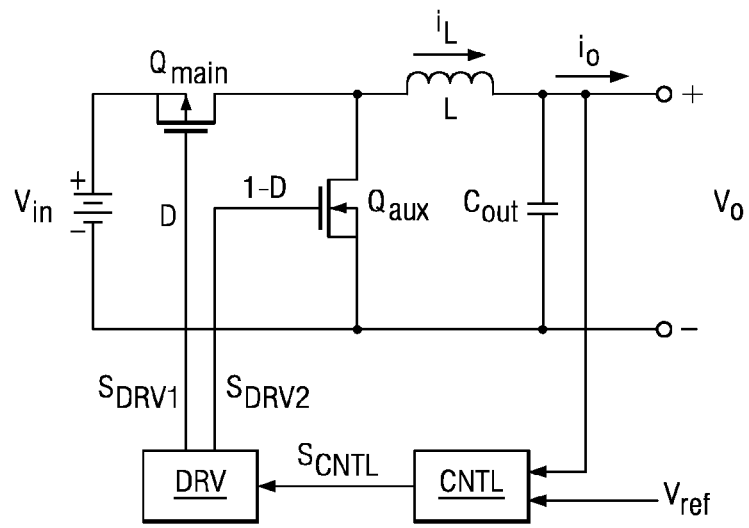
FIG. 1 illustrates a schematic diagram of an embodiment of a power converter constructed according to the principles of the present invention.

Corresponding numerals and symbols in the different figures generally refer to corresponding parts unless otherwise indicated, and may not be redescribed after the first instance in the interest of brevity. The figures are drawn to clearly illustrate the relevant aspects of the preferred embodiments.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Unless otherwise provided, like designators for devices employed in different embodiments illustrated and described herein do not necessarily mean that the similarly designated devices are constructed in the same manner or operate in the same way. It should also be understood that the use of the terms such as "first" and "second" are employed for purposes of explanation and clarity, and reversing such designations when referring to device(s) is well within the broad scope of the present invention.

The present invention will be described with respect to preferred embodiments in a specific context, namely, a controller including linear and nonlinear control circuits operating in a power converter, method of controlling a power converter, and a power converter employing the same. The principles of the present invention may be applied to all types of power supplies employing various conversion topologies that may benefit from a controller for a power converter that is implemented with linear and nonlinear control circuits. The controller provides fast response times to a step change in an output characteristic (e.g., output voltage) as well as to maintain tight output voltage regulation for a step change in output current. Tight control of the output voltage during steady-state operation is maintained with limited sensitivity to noise in the control loop and substantial control loop margins for stability.

In accordance therewith, the present invention provides a controller for a power converter configured to provide a control signal for a power switch therein that provides a wide bandwidth response to changes in a set point for an output characteristic of the power converter. The output characteristics of the power converter include parameters such as output voltage and output current, which may be substantially time varying based on an operational state of the load such as a microprocessor unlike conventional applications where the output characteristics of the power converter are substantially constant with little or no time variation.

In yet another aspect, the present invention provides a power converter couplable to a source of electrical power adapted to provide an input voltage thereto. The power converter includes a power train including a power switch(es) [or switch(es)] configured to conduct for a duty cycle over a switching period in response to a control signal, and provide a regulated output characteristic at an output of the power converter. The power converter further includes a controller configured to provide a control signal to control the duty cycle of the switch(es). The controller includes linear and nonlinear control circuits operating to produce the control signals for the switch(es).

A controller for a power converter employing linear and nonlinear control circuits to provide linear and nonlinear control loops, respectively, are described with reference to selected FIGUREs that follow. The control circuits of the controller overcome control loop bandwidth limitations of the prior art resulting from a limited switching frequency for the power converter. As will further become more apparent, the controller also overcomes control loop bandwidth limitations of the prior art resulting from a loss of controllability in a high bandwidth, high frequency power converter due to sensitivity from noise and circuit parameter uncertainties (such as circuit parasitics, component tolerances, and component parameter variations). Digital systems powered by the power converter call for controllers that accommodate faster control responses, for instance, to provide a quicker response to a step change in output current or to a step change in an output voltage associated with the power converter.

In a controller according to one embodiment, a digital nonlinear control circuit providing a control response (preferably, a minimum-time output voltage transition as described below with respect to FIG. 3) is combined with a digital linear control circuit to effectively increase control bandwidth for a multiphase power converter with a switching frequency that is otherwise insufficient to support a specified power converter response time. Digital linear control is preferable over analog linear control because inappropriate interaction between the nonlinear and linear control circuits can be appropriately avoided using digital techniques.

In a controller according to a second embodiment, feedback of an output capacitor current is used to provide the necessary control loop bandwidth in a high-frequency power converter in a robust way, providing less sensitivity to noise and to circuit parameter uncertainties. In either case, the equivalent linear bandwidth is close to one MHz to meet extreme dynamic response requirements. The exemplary power converters described below follow the guidelines for dynamic voltage scaling and load step regulation as explained by A. Soto, et al. ("Soto"), in "Design Methodology for Dynamic Voltage Scaling in the Buck Converter," published in the Proceedings of the IEEE Applied Power Electronics Conference, pp. 263-269, 2005, which is incorporated herein by reference.

In the first embodiment mentioned above, a fast action of a substantially ideal nonlinear control circuit is parallel-coupled with a linear control circuit. A difference with prior art implementations is that the linear control circuit is designed substantially at or near the maximum bandwidth that the power converter switching frequency allows, which in a practical design may be roughly one-fifth to one-tenth of the switching frequency. In this way, residual errors remaining after the nonlinear control response are corrected as fast as possible. A significant problem with combining a nonlinear control circuit with a linear control circuit is the control circuit interaction. Digital implementation eases combining the control circuit while allowing substantially maximum bandwidth for the linear control circuit.

Referring initially to FIG. 1, illustrated is a schematic diagram of an embodiment of a power converter constructed according to the principles of the present invention. The power converter includes a power train, a controller (designated "CNTL") and a driver (designated "DRV"), and provides power to a system such as a microprocessor. While in the illustrated embodiment, the power train employs a buck topology, those skilled in the art should understand that other topologies such as a forward topology are well within the broad scope of the present invention.

The power train of the power converter receives an input voltage $V_{in}$ from a source of electrical power (represented by a battery) at an input thereof and provides an output current $i_o$ and a regulated output voltage $V_o$ to power, for instance, a microprocessor at an output of the power converter. In keeping with the principles of a buck topology, the output voltage $V_o$ is generally less than the input voltage $V_{in}$ such that a switching operation of the power converter can regulate the output voltage $V_o$. A main switch $Q_{main}$ [e.g., a metal oxide semiconductor field effect transistor ("MOSFET")] is enabled to conduct for a primary interval (generally co-existent with a primary duty cycle "D" of the main switch $Q_{main}$) and couples the input voltage $V_{in}$ to an output inductor (designated "L"). During the primary interval, an inductor current $i_L$ flowing through the output inductor L increases as a current flows from the input to the output of the power converter. An AC component of the inductor current $i_L$ is filtered by an output capacitor $C_{out}$.

During a complementary interval (generally co-existent with a complementary duty cycle "1-D" of the main switch $Q_{main}$), the main switch $Q_{main}$ is transitioned to a non-conducting state and an auxiliary switch $Q_{aux}$ (e.g., a MOSFET) is enabled to conduct. The auxiliary switch $Q_{aux}$ provides a path to maintain a continuity of the inductor current $i_L$ flowing through the output inductor L. During the complementary interval, the inductor current $i_L$ through the output inductor $L_{out}$ decreases. In general, the duty cycle of the main and auxiliary switches $Q_{main}$, $Q_{aux}$ may be adjusted to maintain a regulation of the output voltage $V_o$ of the power converter. Those skilled in the art should understand, however, that the conduction periods for the main and auxiliary switches $Q_{main}$, $Q_{aux}$ may be separated by a small time interval to avoid cross conduction therebetween and beneficially to reduce the switching losses associated with the power converter.

The controller CNTL of the power converter receives a desired characteristic such as a desired system voltage in the form of a reference voltage $V_{ref}$ from an internal or external source associated with the microprocessor, and the output voltage $V_o$ of the power converter. In accordance with the aforementioned characteristics, the controller CNTL provides a signal (e.g., a control signal $S_{CNTL}$) to control a duty cycle and a frequency of the main and auxiliary switches $Q_{main}$, $Q_{aux}$ to regulate the output voltage $V_o$ thereof. The driver DRV is configured to provide drive signals $S_{DRV1}$, $S_{DRV2}$ to the main and auxiliary switches $Q_{main}$, $Q_{aux}$, respectively, based on the control signal $S_{CNTL}$ provided by the controller CNTL. There are a number of viable alternatives to implement a driver DRV that include techniques to provide sufficient signal delays to prevent crosscurrents when controlling multiple switches in the power converter. The driver DRV typically includes switching circuitry incorporating a plurality of driver switches that cooperate to provide the drive signals $S_{DRV1}$, $S_{DRV2}$ to the main and auxiliary switches $Q_{main}$, $Q_{aux}$. Of course, any driver DRV capable of providing the drive signals $S_{DRV1}$, $S_{DRV2}$ to control a switch is well within the broad scope of the present invention.

Figure 2:
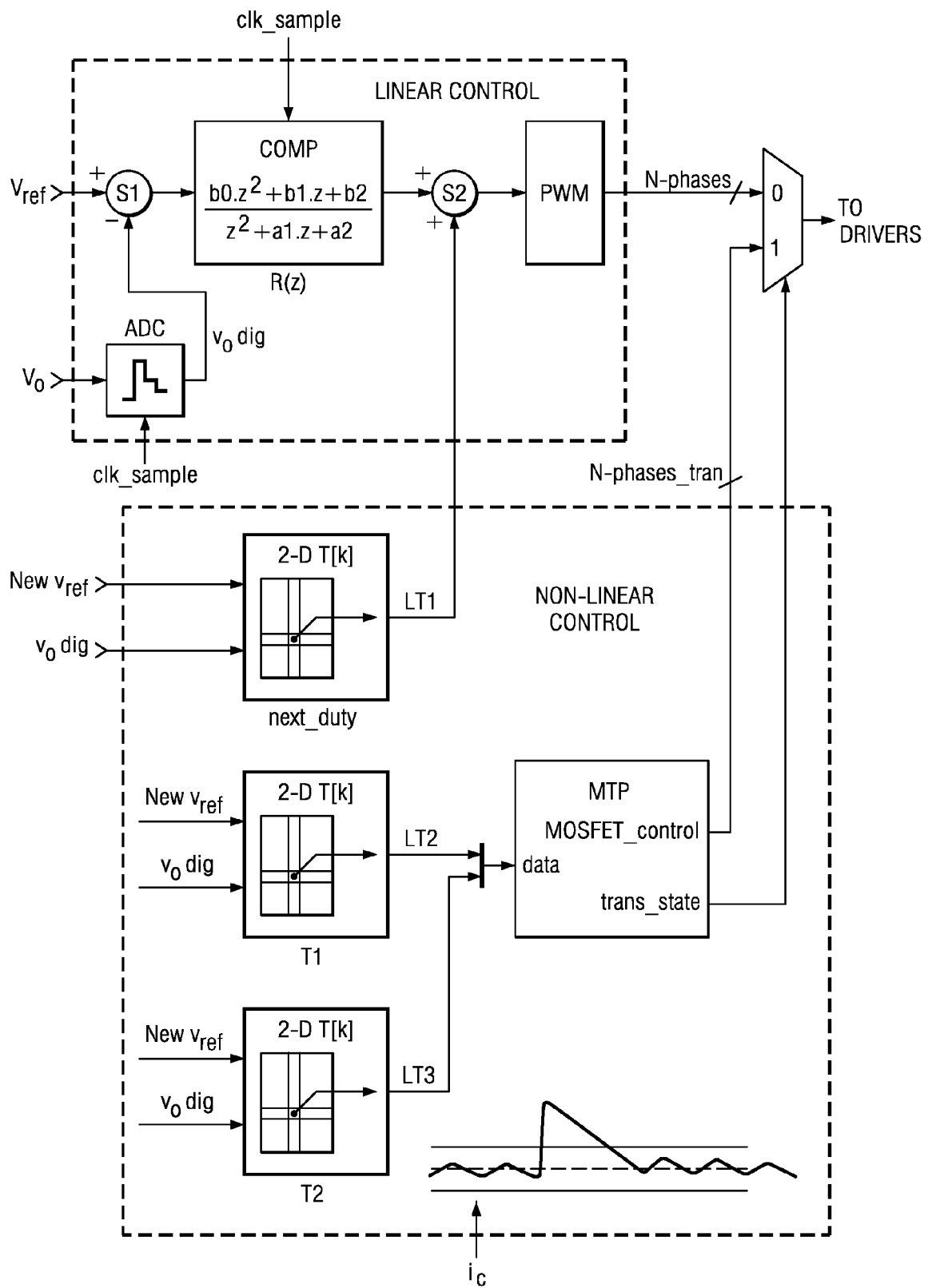
FIG. 2 illustrates a controller constructed according to the principles of the present invention.

Turning now to FIG. 2, illustrated is a controller constructed according to the principles of the present invention. The controller includes a linear control circuit (designated "LINEAR CONTROL") and a nonlinear control circuit (designated "NONLINEAR CONTROL"). A reference signal (e.g., digitized reference voltage $V_{ref}$) is supplied to the linear control circuit to establish a set point for an output characteristic (e.g., output voltage $V_o$) of a power converter employing the controller. The reference voltage $V_{ref}$ is also supplied to the nonlinear control circuit. The output voltage $V_o$ of the power converter is coupled to an analog-to-digital converter (designated "ADC") that produces a digitized version of the output voltage (designated "$v_o$dig"). A first summer (designated "S1") forms an error signal, which is the difference between the reference voltage $V_{ref}$ and the digitized version of the output voltage $v_o$dig. The error signal is coupled to compensator (designated "COMP") and a compensation signal therefrom is provided to a second summer (designated "S2"). A combined compensation signal from the second summer is employed by a modulator (e.g., pulse-width modulator designated "PWM") to generate control signals (also referred to as a "first control signal") such as pulse-width modulated control signals including the duty cycle for the switches of the power converter (which may be designed with N phases).

Figure 3:
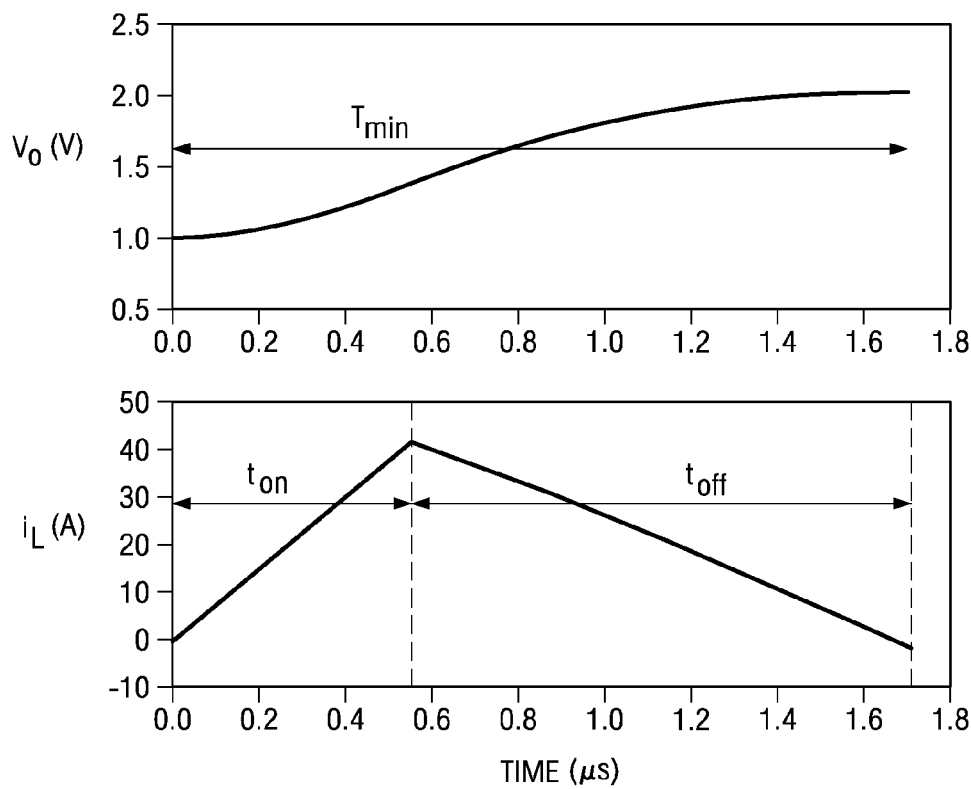
FIGS. 3 and 4 illustrate waveform diagrams demonstrating operational parameters of a controller of a power converter according to the principles of the present invention.

When an output voltage transition occurs, the nonlinear control circuit computes three results using three two-dimensional lookup tables (designated "LT1," "LT2," "LT3") to preferably perform a minimum-time action (see FIG. 3). In each case, a lookup table is accessed using a new reference voltage and the digitized signal representing the output voltage of the power converter. The first lookup table LT1 computes a nominal duty cycle after a step change in the reference voltage $V_{ref}$, as described further below. The second lookup table LT2 computes an initial on (and off) time associated with a substantially minimum-time control to step up (or step down) the output voltage $V_o$. The third lookup table LT3 computes a final off (or on) time of the substantially minimum-time control to step up (or step down) the output voltage $V_o$.

The results from the second and third lookup tables LT2, LT3 are supplied to a processing subsystem (referred to as a minimum-time processing subsystem designated "MTP") that provides a preferable minimum-time action as illustrated with respect to FIG. 3 by taking control of the switches by selecting input "1" in a multiplexer (designated "MUX"). The second summer S2 sums the compensation signal and the result produced from the first lookup table LT1 to derive the combined compensation signal. The combined compensation signal is provided to the modulator to provide a control signal including a new duty cycle to control the switches after a substantially minimum-time transition. The new duty cycle is due to corrections in the compensation signal to correct imperfections in the calculation of the nominal duty cycle and to achieve accurate regulation of the output voltage $V_o$ after, preferably, an ideal control action.

Figure 4:
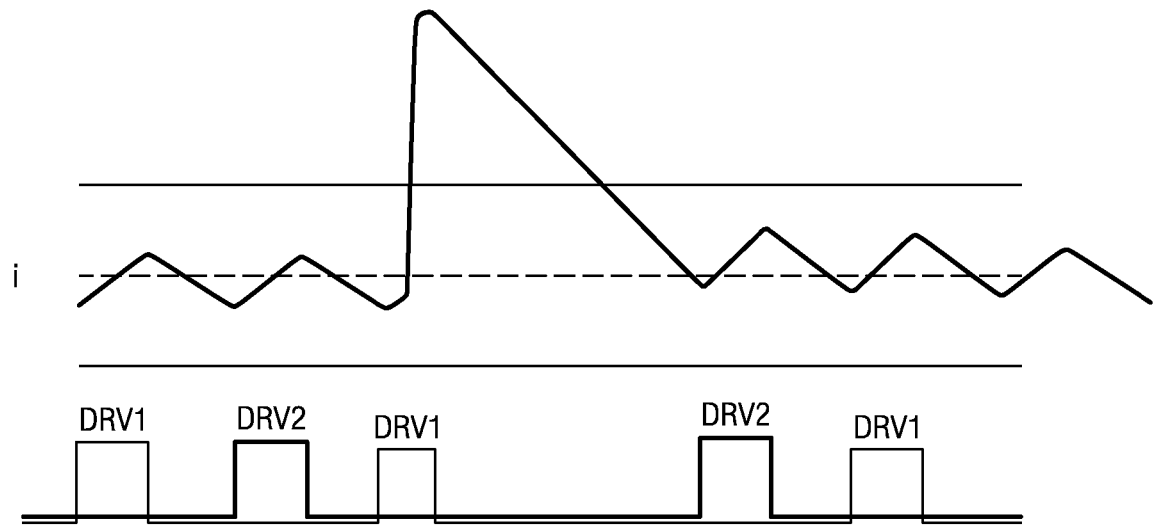

When a load step occurs (the controller can not anticipate when this is going to happen), the nonlinear control circuit closes a switch to cancel a current unbalance in an output capacitor of a power converter as illustrated with respect to FIG. 4. A sensor employable to sense the output capacitor current may be provided as explained in more detail below. The control action is initiated when the output capacitor current goes beyond a band limit (that accounts for the normal ripple current) and is finalized when the output capacitor current returns to zero. Thus, the nonlinear control circuit provides control signals (also referred to as a "second control signal") for the switches of the power converter (which may be designed with N-phases).

A design issue for combining nonlinear and linear control circuits is switching from the nonlinear control loop or process to the linear control loop or process in a manner that avoids instabilities that can result from competing control loop responses. The linear response is initiated when both an inductor current associated with an inductor of the power converter and the output voltage are substantially set by preferably an ideal nonlinear action at the new steady-state values. This is necessary to avoid relying on the slower linear control loop to control the transition to a new steady-state value. When the linear control circuit resumes control, the duty cycle for the new steady-state condition is generally different from its value before the transition. The linear control circuit cannot resume control using a previously computed duty cycle, because that error would lead to undesired oscillations while the duty cycle is corrected to the necessary value for the output current level.

A solution that is incorporated to solve this problem adds a nominal duty cycle to the output of the controller as illustrated in FIG. 2 in such a way that the combined compensation signal supplies a minor correcting action after the nonlinear control action for accurate regulation of the output voltage. If the new duty cycle is calculated correctly, the combined compensation signal will set to a steady-state value. The nominal duty cycle is stored in the first lookup table LT1 and is updated as a function of a new reference voltage during the nonlinear response. The new duty cycle after a step change in the output current is computed as a function of the time to cancel the unbalanced output capacitor current and the dc resistance of the power converter, wherein the voltage drop in the dc resistance due to the output current added to the nominal output voltage should be equal to the duty cycle multiplied by the input voltage of the power converter. The time to cancel the unbalance in the output capacitor current is an indirect measurement of the output current increment. Ideally, if there is no dc resistance in the power converter, the duty cycles before and after the load step are equal. There is no analytical solution for the initial and final time of the substantially minimum time transition. Based on a power converter model, the solution is solved numerically in a computer for each possible transition (initial and final reference voltage), and then stored in a memory such as the lookup tables.

Another design issue that should be addressed involves a further interaction of the nonlinear and linear control circuits. During a fast transient, the linear control circuit normally generates a control response and, upon completion of the fast transient, the linear control circuit makes still further adjustments to the duty cycle. To avoid this interaction, the linear control circuit is effectively disabled during the transition. To avoid interaction of the two control circuits, the sampling clock for the linear control circuit is stopped substantially synchronously with the beginning of the nonlinear control circuit. Thus, the error signal coupled to the linear control circuit will be substantially zero. Advantages of employing a digital linear control circuit that may be readily disabled during a control response by the nonlinear control circuit and adjusted after the response are thus evident.

Recognizing a rate at which the duty cycle is updated as a result of the control responses of the linear and nonlinear control circuits, a sampling frequency for analog signals coupled to the linear and nonlinear control circuits is preferably selected to be as high as possible so as to augment the control loop bandwidth. Preferably, the sampling frequency is the same as the switching frequency of the power converter, allowing a fast response time for the linear control circuit. It can be demonstrated that in a properly designed power converter (see discussion by Soto), an equivalent average discrete model for the power converter can accurately predict the stability behavior thereof when sampling at the switching frequency. Since the linear control circuit is disabled and would be designed not to saturate during the nonlinear control response, the stability of the power converter can be determined by a stability analysis of the linear control circuit.

Drive signals for the switches are produced in conjunction with the multiplexer MUX, which selectively responds to the first and second control signals produced by the linear and nonlinear control circuits, respectively, without intersignal interference. Thus, FIG. 2 illustrates the operation of linear and a nonlinear control circuit operating in parallel to produce a fast time response for a step change in the reference voltage or output current as well as an accurate steady-state control signal. The controller, therefore, selects one of the first and second control signals from the linear and nonlinear control circuits, respectively, for a switch in response to a change in an operating condition (e.g., an output characteristic or reference signal) of the power converter.

A fast control response for step changes in the output voltage is described by Soto. The minimum-time processing subsystem is typically implemented with an open-loop control process. Each time a voltage transition occurs (e.g., detected by a change in the reference voltage), the nonlinear control circuit performs the substantially minimum-time state transition, effectively disabling the linear control circuit, and provides the second control signal for the switches of the N-phases of the power converter. On and off times representing the substantially optimal control waveform for the switches are stored in memory such as the second and third lookup tables LT2, LT3. Both the inductor current and output voltage are substantially, but not perfectly, set to new steady-state values when the transition is completed by the nonlinear control circuit. The linear control circuit then resumes control for final control accuracy.

The fast control response to step changes in the output current is produced by the nonlinear control circuit sensing an output capacitor current. When there is an unbalance in output capacitor current, for example, from a step change in the output current, the linear control circuit is effectively disabled and selected switches of the interleaved phases are closed (or opened) until the unbalanced output capacitor current is substantially, but not perfectly, corrected. Then the linear control circuit resumes control for final control accuracy.

Turning now to FIGS. 3 and 4, illustrated are waveform diagrams demonstrating operational parameters of a controller of a power converter according to the principles of the present invention. The substantially minimum-time transition of the output state of a power converter under no load employs the switching action illustrated herein. Most applications (or loads) stop consuming power to avoid a load malfunction during the voltage transition. If an output current changes during the output voltage transition, then the lookup tables should also account for the load behavior by using, for instance, a Thevenin equivalent circuit during the transient to calculate new duty cycle times. In the bottom waveform of FIG. 3, a substantially ideal inductor current $i_L$ in the output inductor for a substantially minimum-time response is illustrated during the on and off periods of a switch such as a main switch $Q_{main}$ illustrated and described with respect to FIG. 1. The corresponding change in the output voltage $V_o$ without overshoot for a transition from one volt to two volts is shown in the top waveform of FIG. 3. For the case illustrated, the response time for the indicated change is less then two µs. An upper waveform of FIG. 4 is an output capacitor current corresponding to the output voltage transition described with reference to FIG. 3. First and second drive signals DRV1, DRV2 for two phases in a two-phase power converter are illustrated in the lower waveform of FIG. 4.

In a preferred embodiment, the linear control circuit transfer function is implemented as a linear combination of past sampled error signals and past sampled duty cycles to generate the next duty cycle, as described by equation (1).

$$d_k = a_1 \cdot d_{k-1} + \ldots + a_n \cdot d_{k-n} + b_0 \cdot e_k + \ldots + b_m \cdot e_{k-m} \quad (1)$$

In equation (1), $d_i$, depending on a sampling index "i," represents a duty cycle of the present or a previous switching cycle, and the multiplicative factors $a_i$ and $b_i$, similarly dependent on the sampling index "i," represent multiplicative weighting coefficients applied to present or previous switching cycles. Error signals $e_i$ represent the difference between a measured and desired output characteristic. Rounding errors in the digital operations in the control process represented by equation (1) play an important role at high sampling frequencies leading to numerical problems in internal control operations. Long word sizes are preferable to minimize these errors, leading to a more complex control configuration.

Once the linear control has been derived theoretically [coefficients $a_1 \ldots a_n$, $b_0 \ldots b_m$, in equation (1)], a more robust signal conditioning architecture is employed in a preferred embodiment of the present invention that employs fewer memory elements and less hardware resources. Instead of using the well known direct form realization represented directly by equation (1), a controller as provided herein may employ a different structure based on digital integrators as illustrated with respect to FIG. 5.

Figure 5:
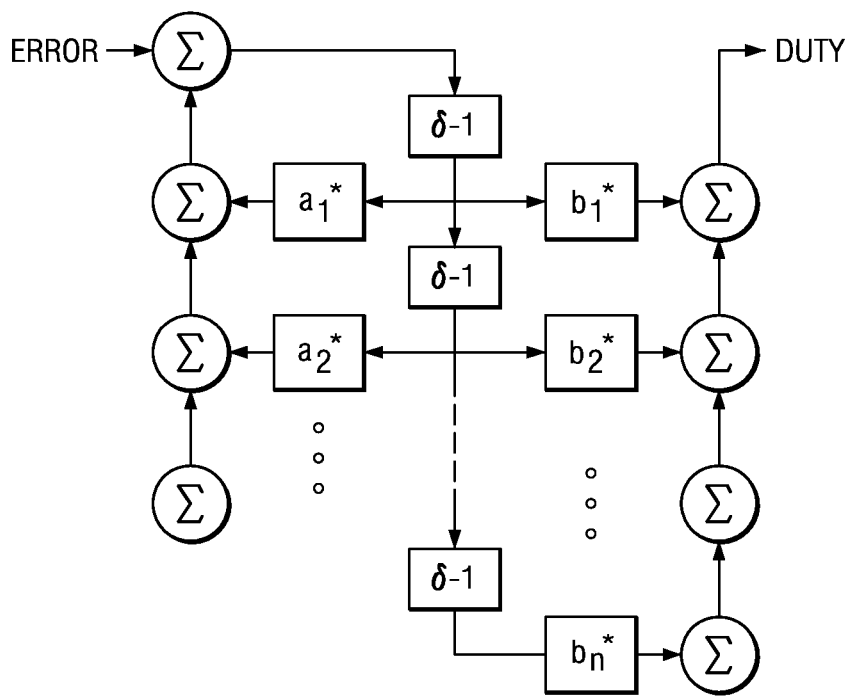
FIG. 5 illustrates a functional diagram representing control elements associated with a controller constructed according to the principles of the present invention.

Turning now to FIG. 5, illustrated is a functional diagram representing control elements associated with a controller constructed according to the principles of the present invention. The control structure is designed to provide (before digitization of the internal signals) an analogous output (for the same input) as the previously calculated controller represented by equation (1) above. Control elements with the symbol "$\delta^{-1}$" represent discrete integrators, wherein $y_k = y_{k-1} + u_{k-1}$ results in the output "y" in an instant, "k" being the addition of the one-cycle delayed output $y_{k-1}$ and the one-cycle delayed input $u_{k-1}$. The control elements with the symbols $a_i^*$ ... $b_i^*$ represent a constant multiplicative weighting coefficient. The circular elements represent summers that form the addition of two input signals. The input signal (designated "Error") to the transfer function is an error signal and the output signal (designated "Duty") is a control signal that, added to the nominal duty cycle from the nonlinear control circuit, forms the control signal with the duty cycle for a switch for the accurate steady-state control of an output characteristic of the power converter.

A pure integration process is often employed for accuracy and to avoid limit cycles as described by A. V. Peterchev, et al. ("Peterchev"), in "Quantization Resolution and Limit Cycling in Digitally Controlled PWM Converters," published in the IEEE Trans. Power Electronics, vol. 18, pp. 301-308, January 2003, which is incorporated herein by reference. The precision of the integration process may be ensured if the coefficient $a_n = 0$, thereby eliminating a multiplication. The analog-to-digital signal conversion delays as well as switch driving delays should be considered for completeness in the stability analysis. Making the coefficient $b_0^* = 0$, a compensator (see FIG. 2) does not rely on the present input to determine the present output, which would be subject to delays. Then the predicted stability and performance become insensitive to delays as long as the delay is less than the period of one switching cycle. If it is longer, then the coefficient $b_1^*$ should be zero, but the performance would be degraded.

The quantization resolution of the analog-to-digital conversion is a function of the accuracy in the output voltage. The modulation (e.g., pulse-width modulation) control process should also provide a resolution in duty cycle timing that, translated to output voltage, is higher than the analog-to-digital conversion resolution. In this manner, it is possible to avoid limit cycles, as described by Peterchev. Asynchronous techniques could be used if the clock frequency is too high or if more accuracy is desired, as described by B. J. Patella, et al., in "High-Frequency Digital Controller IC for DC-DC Converters," published in the IEEE Transactions on Power Electronics, pp. 438-446, June 2003 (also published in the IEEE Proceedings of the Applied Power Electronics Conference, Mar. 10, 2002), which is incorporated herein by reference.

New technologies for switches are available that enable higher switching frequencies with higher power conversion efficiency and small size. Despite continuing improvements in the switches, control loop bandwidth is still limited, nonetheless, to a fraction of the switching frequency as described above. Fast linear control in high frequency power converters is inherently very sensitive to noise, parasitics, uncertainties and variations for wide bandwidth arrangements, both in the power train and the controller, which become limiting factors in designing a power converter with fast transient response time.

Linear digital control presents an alternative to avoid problems in the controller implementation. However, parameter uncertainties and variations in the power train such as parasitic circuit elements and even lumped circuit inductances are difficult to avoid. Besides, as the sampling frequency increases, the cost and complexity of the analog-to-digital converters and modulators also increase. Hysteretic control techniques and $V^2$ control techniques also have problems at high bandwidth and are not suitable to change the output voltage with a fast response time. A remaining problem is that the techniques also suffer from noise issues when trying to increase control loop bandwidth. Both techniques follow sensing the output ripple voltage, which is very small compared to its dc value. It is also necessary to have a triangular output ripple waveform controlled by the effective series resistance of the output capacitor (or an added resistor) that worsens regulation under load changes. The transient response under step changes in output voltage is very aggressive since the voltage error is attempted to be corrected in one switching action, effectively trying to perform the correction faster than in minimum time. The inductor current is not settled at the end of the transient and a value thereof should be limited during the voltage step.

An alternative to these control strategies that is applicable in high-frequency power converters as described herein combines noninteracting linear and nonlinear control circuits. A nonlinear control circuit can provide a robust, fast control response. Then, a linear control loop, which is less sensitive to noise and plant variations, provides steady-state control accuracy. Considerations for multiphase power converters should also be considered. Hysteretic control of MOSFET switches in conjunction with the output capacitor current is described by G. K. Schoneman, et al., in "Output Impedance Considerations for Switching Regulators with Current-Injected Control," published in the Proceedings of the IEEE Power Specialist Conference, pp. 324-335, 1987, which is incorporated herein by reference, and by Redl.

Figure 6:
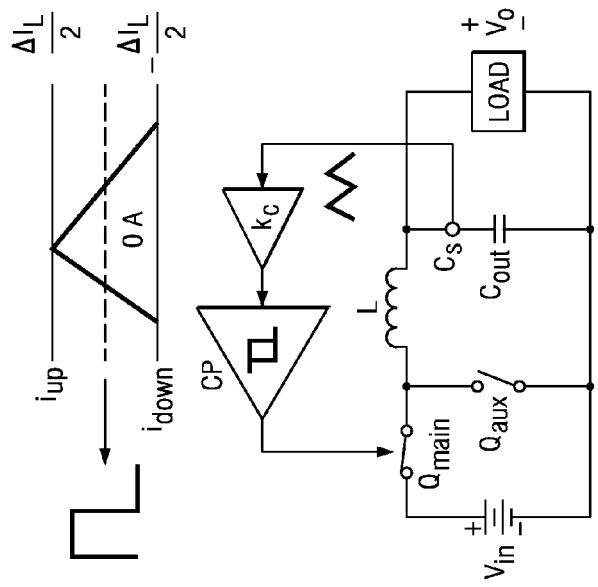
FIG. 6 illustrates a schematic diagram of an embodiment of a power converter constructed according to the principles of the present invention.

Turning now to FIG. 6, illustrated is a schematic diagram of an embodiment of a power converter constructed according to the principles of the present invention. The power converter employs a buck topology coupled to a source of electrical power (represented by a battery) for providing an input voltage $V_{in}$ and producing an output voltage $V_o$ to power a load (designated "Load") such as a microprocessor. A switching action of the power converter is provided by main switch $Q_{main}$ and auxiliary switch $Q_{aux}$. The main and auxiliary switches $Q_{main}$, $Q_{aux}$ are frequently implemented with MOSFETs, but the auxiliary switch $Q_{aux}$ may also be implemented in some applications with a diode. The main and auxiliary switches $Q_{main}$, $Q_{aux}$ are coupled to the output inductor (designated "L"), which in turn is coupled to the load. The output voltage $V_o$ is filtered by an output capacitor (designated "$C_{out}$").

While a current sensor (designated "$C_s$") such as current-sense transformer may be employed herein, it may introduce substantial impedance for proper attenuation of a ripple current because of the series-coupled output inductor L. The current sensor $C_s$ feeds back an output capacitor current through a compensator (designated with a gain $k_c$) through a modulator (including a hysteretic comparator designated "CP") to control the switching action of the main switch $Q_{main}$. A driver (not shown) may also be incorporated between the modulator and the main switch $Q_{main}$. Additionally, a switching action of the auxiliary switch $Q_{aux}$ may be controlled in a complementary manner. The hysteretic comparator CP forces the output capacitor current to be within the hysteretic band.

When the output capacitor current crosses the upper limit of the band, the main switch $Q_{main}$ is opened, the auxiliary switch $Q_{aux}$ is closed, and the output capacitor current starts to decrease. When the output capacitor current crosses the lower limit, the auxiliary switch $Q_{aux}$ is opened, the main switch $Q_{main}$ is closed, and the output capacitor current starts to increase. The operation of a power converter may be controlled as set forth below with respect to FIG. 7. In steady state, the output capacitor current should have a zero-mean value. The steady-state voltage and current operating points for a controller including a linear control circuit (e.g., an inner linear control circuit or inner control loop) are difficult to determine because the smallest offset in the mean value of the hysteretic band that is included in the comparator CP will make the output voltage $V_o$ drift to substantially zero or a substantially maximum value.

Figure 7:
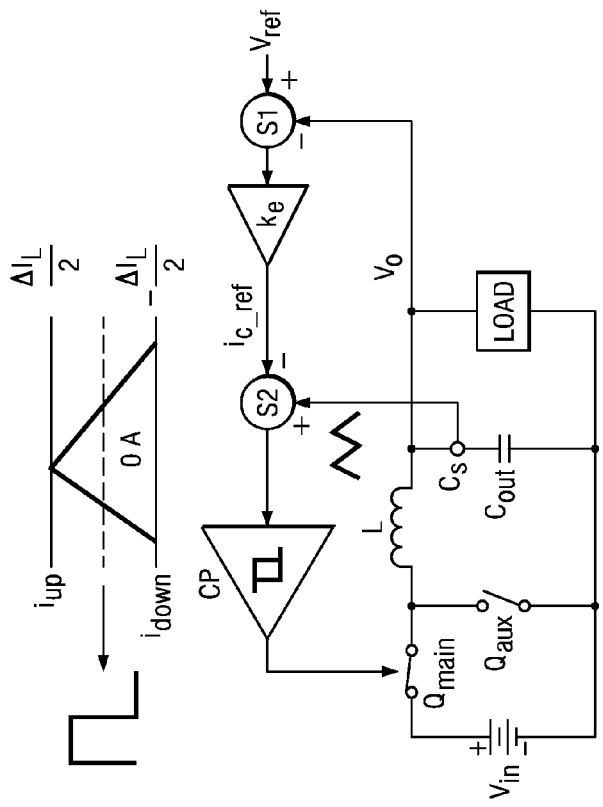
FIG. 7 illustrates a schematic diagram of another embodiment of a power converter constructed according to the principles of the present invention.

Turning now to FIG. 7, illustrated is a schematic diagram of another embodiment of a power converter constructed according to the principles of the present invention. The components of the power converter with like designators to the power converter illustrated and described with respect to FIG. 6 will not hereinafter be described. A controller as illustrated herein includes the inner linear control circuit (see, e.g., the compensator and modulator of FIG. 6) and an outer linear control circuit (also referred to as "outer control loop") including first and second summers (designated "S1" and "S2"), and a compensator (designated with a gain $k_e$) with a static feedback gain. The controller receives a reference voltage $V_{ref}$ and an output voltage $V_o$ and controls the main and auxiliary switches $Q_{main}$, $Q_{aux}$ to provide a regulated output voltage $V_o$ at the output of the power converter. The output capacitor current measurement is positive when the current is flowing into the output capacitor and the control loop ensures a substantially zero dc value for the output capacitor current.

There are many advantages associated with the controller of the present invention. The controller achieves the tight output voltage regulation under dynamic load changes since the current unbalance in the output capacitor is preferably ideally corrected (according to hysteretic control by sensing the effective series resistance ripple voltage). On the other hand, the dynamics and influence of the output inductor, resistance of the MOSFET switches, and switch dead-times are substantially cancelled, and the control process becomes substantially robust. The controller, or sections thereof, is substantially a first-order system, which is generally easier to compensate to produce a stable and high bandwidth feedback arrangement.

Figure 8B:
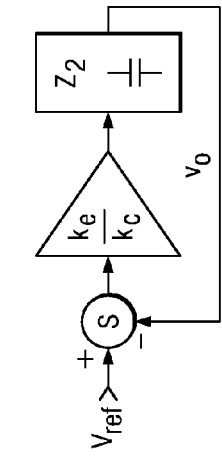
Figure 8A:
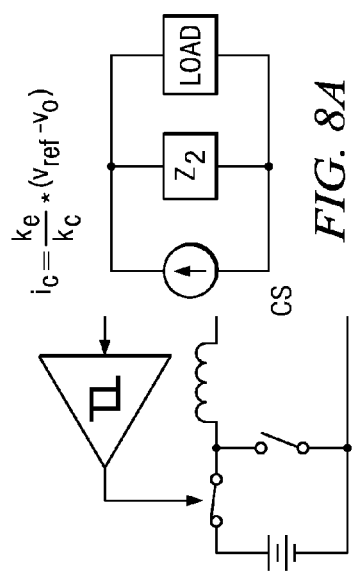
Figure 10:
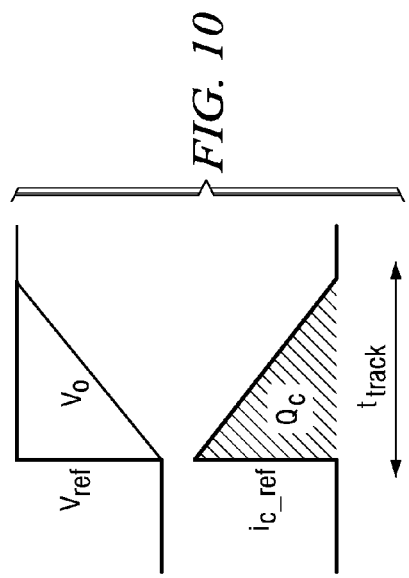

Turning now to FIGS. 8 to 10, illustrated are diagrams of equivalent circuit models and waveform diagrams demonstrating an operation of embodiments of controllers in accordance with the principles of the present invention. In FIG. 8A, a load (designated "Load") is shown coupled in parallel with an impedance $Z_2$, representing an impedance of an output capacitor (see, e.g., FIG. 6). The model also illustrates a current source CS that represents a source of electrical power, switches such as main and auxiliary switches $Q_{main}$, $Q_{aux}$, and an inner linear control circuit for the output capacitor current (see, e.g., FIG. 6). Additionally, FIG. 8B illustrates a model for an outer linear control circuit of a controller including a summer (designated "S") that produces an error signal coupled to a compensator (designated with a gain $k_e/k_c$) and an output capacitor (represented by an impedance "$Z_2$"). A reference voltage $V_{ref}$ and output voltage $V_o$ are provided to the summer S of the outer linear control circuit.

In general, a gain for the compensator is typically sufficient to stabilize a substantially first-order feedback configuration. The gain of the outer linear control circuit should be limited to avoid amplification of the output ripple voltage and its interaction with the inner linear control circuit. Considering the first harmonic of the output ripple voltage, a criterion for non-interaction of the linear control circuits is set forth below.

$$\frac{k_e \cdot \Delta V_{pp}}{k_c \cdot \Delta i_L} << 1 \Rightarrow Z_2(f_{sw}) \cdot \frac{k_e}{k_c} << 1 \qquad (2)$$

Therefore, a gain ratio $k_e/k_c$ at the switching frequency should be limited to meet equation (2). A pole may be added to the linear control circuits at the resonant frequency of the output capacitor to substantially cancel the increased gain due to the effective series inductance of the output capacitor and to avoid further interaction of the control circuits.

Two cases are presented for consideration to meet the criterion represented by equation (2). The switching frequency could be selected to be above or below the resonant frequency of the output filter including the output inductor and the output capacitor. If it is above the resonant frequency of the output filter, the bandwidth of the outer linear control circuit should be limited to about one-tenth of the resonant frequency. If it is below the resonant frequency of the output filter, the bandwidth should be limited to about one-tenth of the switching frequency. A delta bandwidth ΔB is given by equation (3), wherein the divisor "10" in the equation below is an approximate number that could be as low as five in a careful design. The symbol $f_{sw}$ represents the switching frequency of the power converter, and symbol $f_{res}$ represents the resonant frequency of the output filter.

$$\Delta B_{min} \leq \min\left(\frac{f_{sw}}{10}, \frac{f_{res}}{10}\right) \quad (3)$$

The condition represented by equation (3) is illustrated in FIG. 9A for a switching frequency limit, and in FIG. 9B for a limit based on the high-frequency pole of the output filter. The drop in frequency of one decade shown in the FIGUREs corresponds to the divisor 10 in equation (3). Under these conditions, the outer linear control circuit can be analyzed using averaging techniques, as is well understood in the art.

Since the gain of the outer linear control circuit (preferably, one pole) determines bandwidth thereof, it also determines the corresponding response time after step changes in the reference voltage. High gain at relatively high frequency (leading to a wide bandwidth) is preferable to meet shorter transition times. Design issues are related to how much bandwidth is necessary to meet tracking times for voltage transitions and to substantially avoid interactions between the control circuits while meeting tracking response time.

The response time for a step change in the reference voltage relies on the outer linear control circuit. As indicated in FIG. 10, when a step change in the reference voltage controlling the output voltage set point occurs, the instantaneous mean value over a cycle of output capacitor current is proportional to an error signal such as a voltage error. It is assumed that the voltage error, and thus the output capacitor current, changes linearly from an initial voltage level to a final voltage level. The assumption, however, is faulty, because if the output voltage changes as a straight line, the output capacitor current should be constant. What is important is that the voltage error changes from an initial maximum value to substantially zero within a transition time $t_{track}$. The assumption above approximates the transition as a line (for example, as illustrated by the output voltage $V_o$ transition of FIG. 3). Then a charge $Q_c$ illustrated in the lower waveform of FIG. 10 delivered to (or removed from) the output capacitor resulting from a change in output voltage $\Delta v_o$ with a response time $t_{track}$ for the feedback gains $k_e, k_c$ is represented by equation (4) below.

$$Q_c = \frac{1}{2} \cdot t_{track} \cdot \frac{k_e}{k_c} \cdot \Delta v_o \quad (4)$$

This charge should equal the charge to change the output voltage for an output capacitor with capacitance C as represented by equation (3).

$$\frac{1}{2} \cdot t_{track} \cdot \frac{k_e}{k_c} \cdot \Delta v_o = C \cdot \Delta v_o \Rightarrow \frac{k_e}{k_c} = \frac{2 \cdot C}{t_{track}} \quad (5)$$

Therefore, the constant gain ratio $k_e/k_c$ given by equation (5) ensures the same tracking time for step changes in the reference voltage. When the gain also meets the condition represented by equation (3), it avoids interaction of the control circuits. As explained in the following paragraph, equations (5) and (3) are preferably satisfied as a pair.

The power train of a power converter should be designed, therefore, to meet the tracking time and the output ripple voltage as described by Soto. The output filter of the power converter should be designed to provide the necessary tracking time, and the switching frequency should be high enough to limit the output ripple voltage. In accordance therewith, it can be proved that for a design as given by equation (5) that the conditions represented by equation (3) can be met, and that the delta bandwidth is given approximately by equation (6).

$$\Delta B = \frac{1}{\pi \cdot t_{track}} \text{ (added Hz)} \quad (6)$$

In this control process, the control circuit bandwidth to meet the tracking time is less than that used in voltage mode or in current mode control methods.

The width of the hysteresis band should be changed as a function of the voltage reference if a constant frequency is desired. The limits of the hysteresis band are signals coupled to the hysteresis comparator that can be changed according to the nominal duty cycle, which is dependent on the voltage reference, as indicated by the equations below:

$$i_{up} = \frac{k_c}{2} \cdot V_{in} \cdot \frac{d \cdot (1-d)}{L \cdot f_{sw}},$$

and $$i_{down} = -\frac{k_c}{2} \cdot V_{in} \cdot \frac{d \cdot (1-d)}{L \cdot f_{sw}},$$

as represented in FIGS. 6 and 7. In this manner, the switching frequency can be kept substantially constant, and can be easily implemented, particularly in a digital control configuration.

There is a dc error in the output voltage set point if the linear control circuit alters a current reference after a variation in the output voltage, input voltage, or the reference voltage. The dc voltage error $V_{error}$ is given by equation (7):

$$V_{error} = \frac{i_{c\_ref}}{k_e}, \quad (7)$$

where the current reference $i_{c\_ref}$ represents the static (dc) current reference for the inner linear control circuit and the gain $k_e$ is the static (dc) gain of the compensator. If, under any operating condition, the current reference were substantially zero (or constant) then there would be little or no dc error voltage. This is an important advantage of using hysteretic control for the output capacitor current. The dc accuracy is improved under fast variations of the output current and input voltage because the hysteretic band is centered about zero and the output capacitor current is triangularly shaped, to a good approximation. Then the mean value of the output capacitor current is forced to be substantially zero, independent of duty cycle. The linear control circuit does not need to change the current reference $i_{c\_ref}$ for load or input voltage variations. Thus, the accuracy is less sensitive to the slower outer linear control circuit. A disadvantage is the slight change in switching frequency needed to produce the duty cycle, but that can be corrected as explained above.

This is an important advantage of hysteretic control over other control solutions for the inner linear control circuit resulting in a substantially constant on time, constant off time, and peak current control (at constant frequency) with a compensation ramp. With these alternatives, the outer linear control circuit changes the peak current reference to change the duty cycle. Therefore, the speed of adaptation becomes sensitive to the speed of the linear control circuit.

Although ideally there is no dc offset voltage error associated with the output voltage of the power converter, it could be introduced by a practical implementation. Usually, the offset error in the hysteretic band is substantially constant and independent of the operating point, which may be addressed as set forth below.

Figure 11:
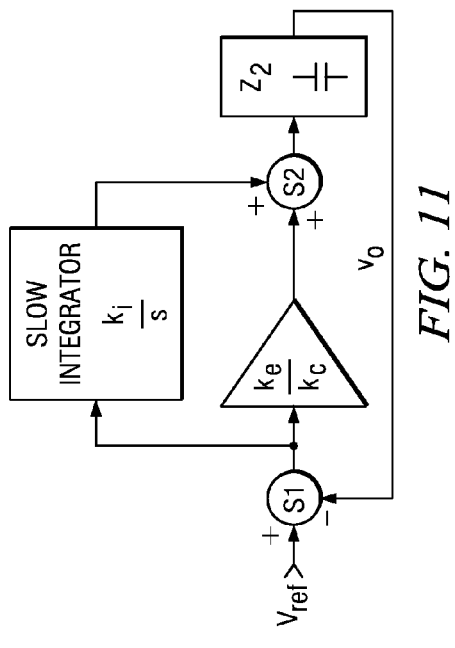
FIG. 11 illustrates a diagram of a controller constructed according to the principles of the present invention.

Turning now to FIG. 11, illustrated is a diagram of a controller (or sections thereof) constructed according to the principles of the present invention. A linear control circuit of the controller provides for self correction of a dc error in an output voltage of a power converter. A reference voltage $V_{ref}$ establishes a set point for an output voltage $V_o$ of the power converter. An error signal is generated by a first summer (designated "S1") from the reference voltage $V_{ref}$ and the output voltage $V_o$. The error signal is coupled to a compensator (designated with a gain $k_e/k_c$) and a compensation signal is coupled to a second summer (designated "S2"). The output of second summer S2 is functionally coupled to an output capacitor (represented by an impedance block designated "$Z_2$"). A slow integrator (designated with a with gain $k_i/s$) is coupled to the error signal from the first summer S1. The output of the slow integrator is also coupled to second summer S2. The gain of the slow integrator in FIG. 11 should be low enough to substantially avoid instabilities and control circuit interactions.

In a preferred embodiment, the output capacitor current is measured and fed back to a nonlinear control circuit. There are many methods that can be found in the literature to measure a current such as output capacitor current using current sense transformers, resistors, and Hall sensors. A direct measurement of output capacitor current adding a circuit component in series with an output capacitor may not be practical, particularly for low voltage power converter applications. The aforementioned measurement may not be practical because of an introduction of substantial impedance for the switching current, thereby detracting from the action of the output capacitor.

A well known method to measure an output capacitor current without adding a series component is to add an RLC network in parallel with the output capacitor. If such a network is designed with the same time constants as the output capacitor but with scaled impedance, then the "mirrored" current in this network is proportional to the current through the output capacitor. In many cases, the time constant due to the equivalent series inductance ("ESL") of the output capacitor is very small, and can be neglected.

The mirrored current can be sensed using the previous methods or by measuring the voltage drop in an added resistor. This drop is equal to an effective series resistance ("ESR") component of the output ripple voltage, which should be very small. This can complicate a differential measurement since a high-bandwidth, high-gain amplifier is generally needed, which may also be very sensitive to noise. In a preferred embodiment, the measurement of the mirrored current is accomplished with a transimpedance amplifier as illustrated in FIG. 12A. The construction and operation of a transimpedance amplifier with an operational amplifier such as illustrated in FIG. 12A will be apparent to one skilled in the art, and will not hereinafter be described. This method of sensing the mirrored output capacitor current is preferred because the gain and bandwidth of the sense amplifier are not coupled. It is possible to have a bandwidth as high as the unity gain bandwidth of the amplifier ΔGB (which is substantially equal to the gain-bandwidth product of the operational amplifier) at any transimpedance value (or gain). Usually the required transimpedance is not high and is consequently less sensitive to noise.

Figure 12B:
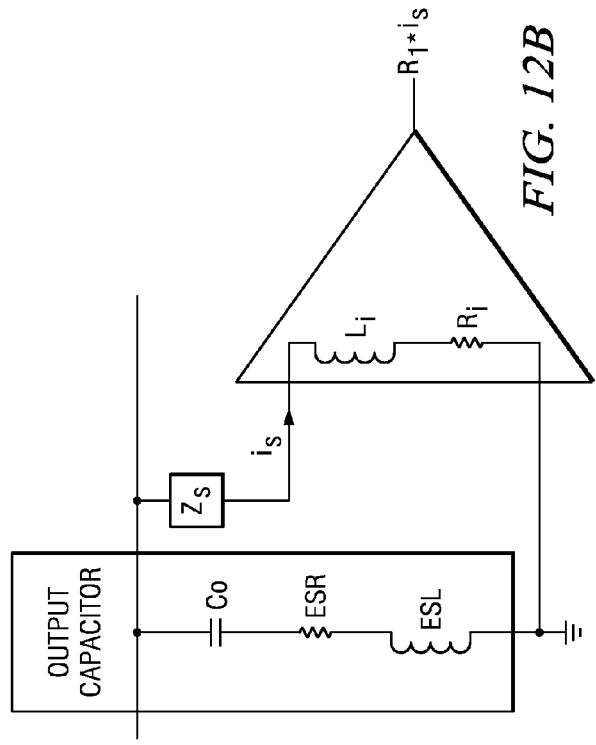
Figure 12A:
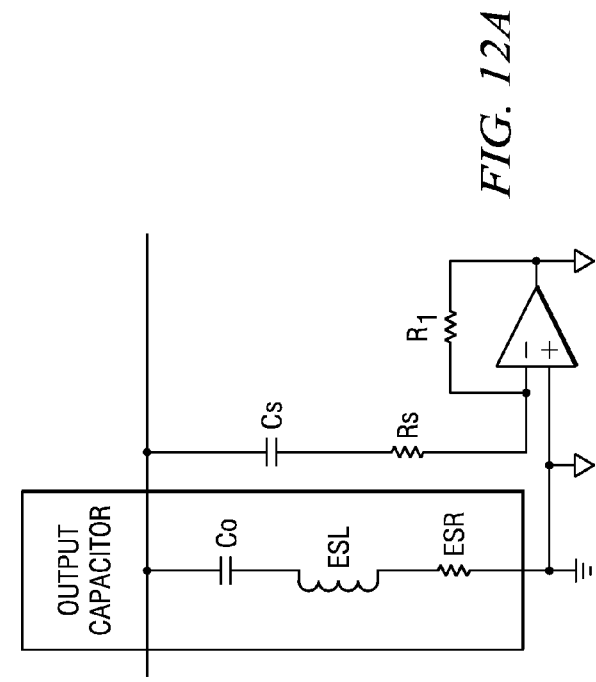

Turning now to FIGS. 12 and 13, illustrated are diagrams of embodiments of sensing circuits that measure currents of a capacitor according to the principles of the present invention. The transimpedance amplifier illustrated in FIG. 12A introduces dynamics to the sensing circuit that affects the mirrored current from the output capacitor. It is an R-L impedance given by equations (8a) and (8b) below, in which $A_{o\_dc}$ is the dc open loop gain of the operational amplifier, and $R_1$ (transimpedance value of the amplifier) is the resistance of the feedback resistor illustrated in FIG. 12B.

$$L_i = \frac{R_1}{\Delta GB} \tag{8a}$$

$$R_i = \frac{R_1}{A_{o\_dc}} \tag{8b}$$

The values $R_i$ and $L_i$, representing the resistance and inductance of the inserted R-L impedance (indicated above) indicated by equations (8a) and (8b) above, should be taken into account in the design of the sensing circuit to emulate the time constant due to ESL in cases when necessary. This way, an added inductor can be avoided.

The sensing circuit illustrated in FIG. 13 can be used to match the ESL time constant of the output capacitor should the ESL affect the output ripple voltage. It is important to be able to independently adjust the transimpedance value (or gain) and the inductance $L_i$. For a fixed resistance $R_1$ (transimpedance value), the potentiometer changes $A_{o\_dc}$ (the open-loop gain of the operational amplifier), which in turn changes the gain bandwidth of the amplifier ΔGB, and the inductance $L_i$ as indicated by equation (8a).

The power converter employing a controller as described herein provides outstanding results, especially for power converters designed for variable output voltage and step load regulation. For instance, a power converter employing the buck topology provides high efficiency at two volts-20 amperes, with two μs transitions from one volt to two volts, tight regulation (e.g., 200 mV) under aggressive 20 ampere load steps, and an output ripple voltage less than 20 mV. The power converter may include four phases with a 200 nH output inductor in each phase and one SO8 FDS7766 MOSFET (exhibiting 6 mΩ Rds_on) for each switch and fast drivers (less than 20 ns delay). With an output capacitor of 35 μF and a switching frequency 500 kHz, the efficiency of the power converter is about 89% at two volts-20 amperes output. A linear control circuit of the prior art would ordinarily require a bandwidth of 500 kHz and at least two MHz switching frequency to meet the tracking time and regulation requirements for step changes in the output current. The controller embodied in a field-programmable gate array employing pulse-width modulation timing resolution in a synchronous arrangement using a fast clock provides tight regulation and outstanding performance for the power converter.

Figure 14:
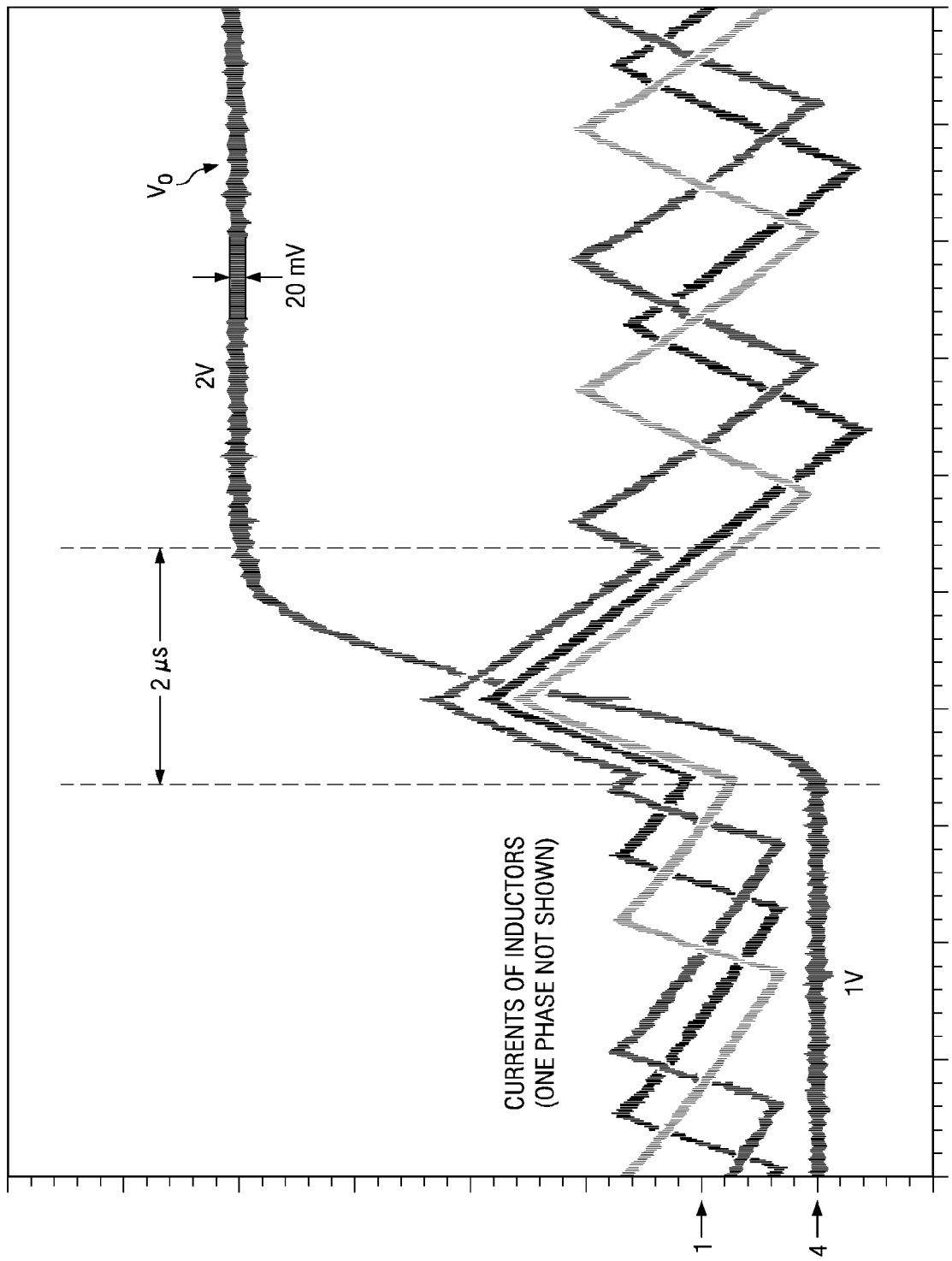
FIGS. 14 to 19 illustrate graphical representations demonstrating operational advantages in accordance with the principles of the present invention.

Turning now to FIGS. 14 to 19, illustrated are graphical representations demonstrating operational advantages in accordance with the principles of the present invention. The advantages associated with the first embodiment of the controller as described above are evident from the graphical representation of FIG. 14 illustrating a response of the nonlinear control circuit when a voltage reference is changed in a step from one volt to two volts, with a two μs response time. The scales on the graph are one μs/division for time on the horizontal axis, 200 mV/division for the output voltage $V_o$, and five A/division for inductor current and includes waveforms of the inductor current in the individual phases. All of the phases work cooperatively to produce a fast voltage transition by performing substantially minimum-time control.

Figure 15:
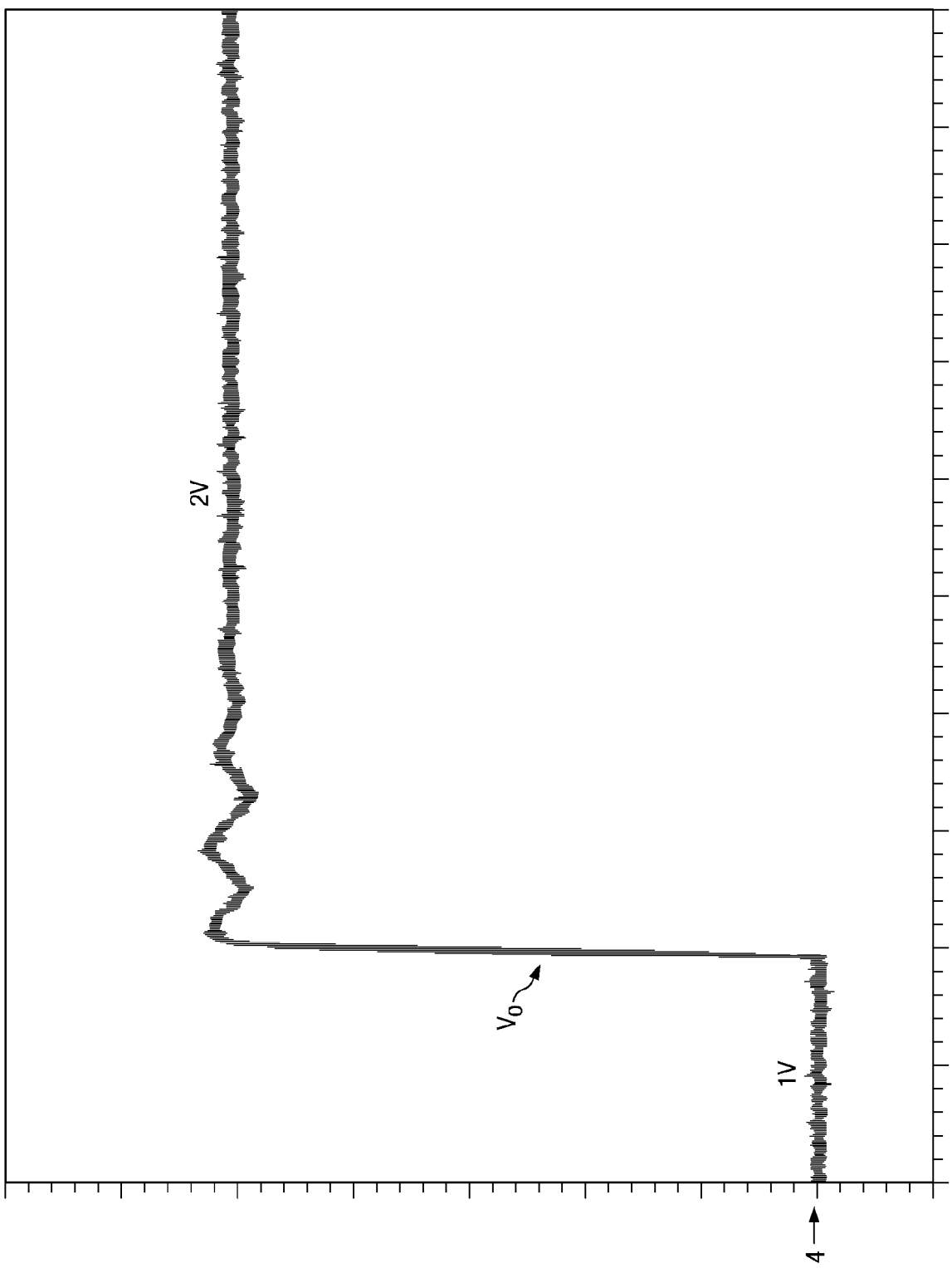

With respect to FIG. 15, illustrated is the effect of the digital linear control circuit resuming control after a substantially minimum-time transition (with a time scale ten times higher than in FIG. 14). There are some small oscillations in the output voltage $V_o$ after the voltage step while the linear control circuit adapted completely to the new conditions. Although the duty cycle is updated after the transition and the control is not saturated, the control circuit still determines the new duty cycle. Despite the oscillations, the output voltage $V_o$ remains within a ±40 mV error band (±2% of the final value) until the new steady-state output voltage $V_o$ is reached.

Figure 16:
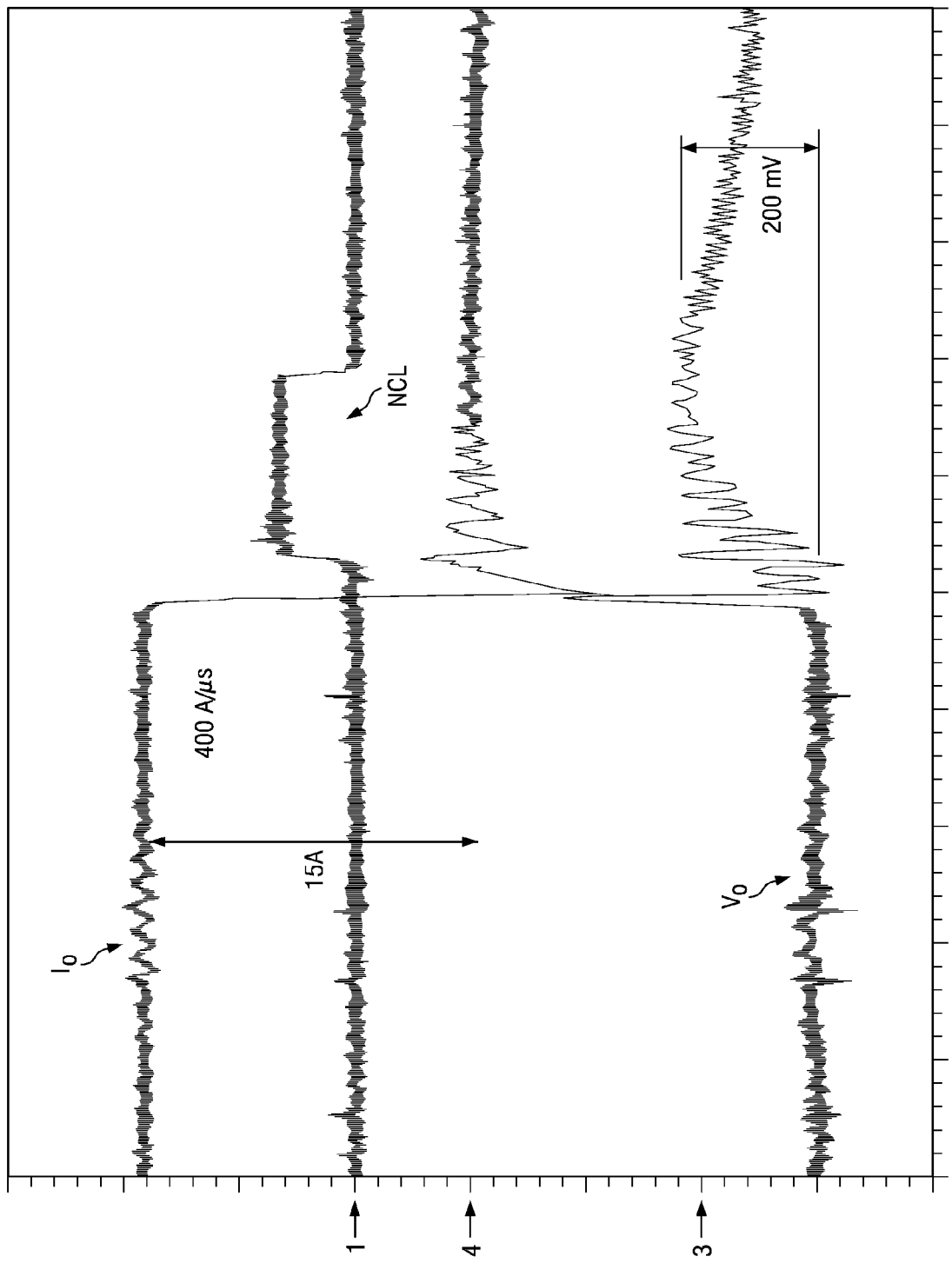

Turning now to FIG. 16, illustrated is the dynamic response for a step change in output current for a 400 A/μs load step. The scale is 400 ns/division along the horizontal time axis, 200 mV/division for output voltage $V_o$, and five A/division for the output current $I_o$. The control process achieves a substantially ideal control response, and the output voltage $V_o$ recovers within the tolerance band, which is very fast considering 200 mV of output voltage deviation with only 35 μF of output capacitance. A waveform designated NCL represents the action of the nonlinear control circuit for load steps.

Exploring another power converter with a buck topology yields similar results. The power converter provides high efficiency for an output providing two volts-one ampere, very small size, two μs output voltage transitions from one volt to two volts, tight output voltage regulation (e.g., 20 mV) under aggressive one ampere load steps, and output ripple voltage less than five mV. The power converter is single phase with a 100 nH output inductor and fast switching MOSFETs. With an output capacitor of four μF and the switching frequency of five MHz, the efficiency of the power converter is about 90% at 1.5 volts-one ampere output.

A linear control circuit of the prior art would ordinarily require 800 kHz control system bandwidth. This control bandwidth is feasible at five MHz switching frequency for the power converter. However, it is ordinarily difficult to get a robust control process with such bandwidth because of noise and the power converter parameter variations. The controller of the present invention based on hysteretic control of the output capacitor current is robust and very fast. The gain ratio of the control loops is designed as given by equation (5). The output capacitor current is measured with the amplifier arrangement illustrated and described above with reference to FIGS. 12A and 12B.

Figure 17:
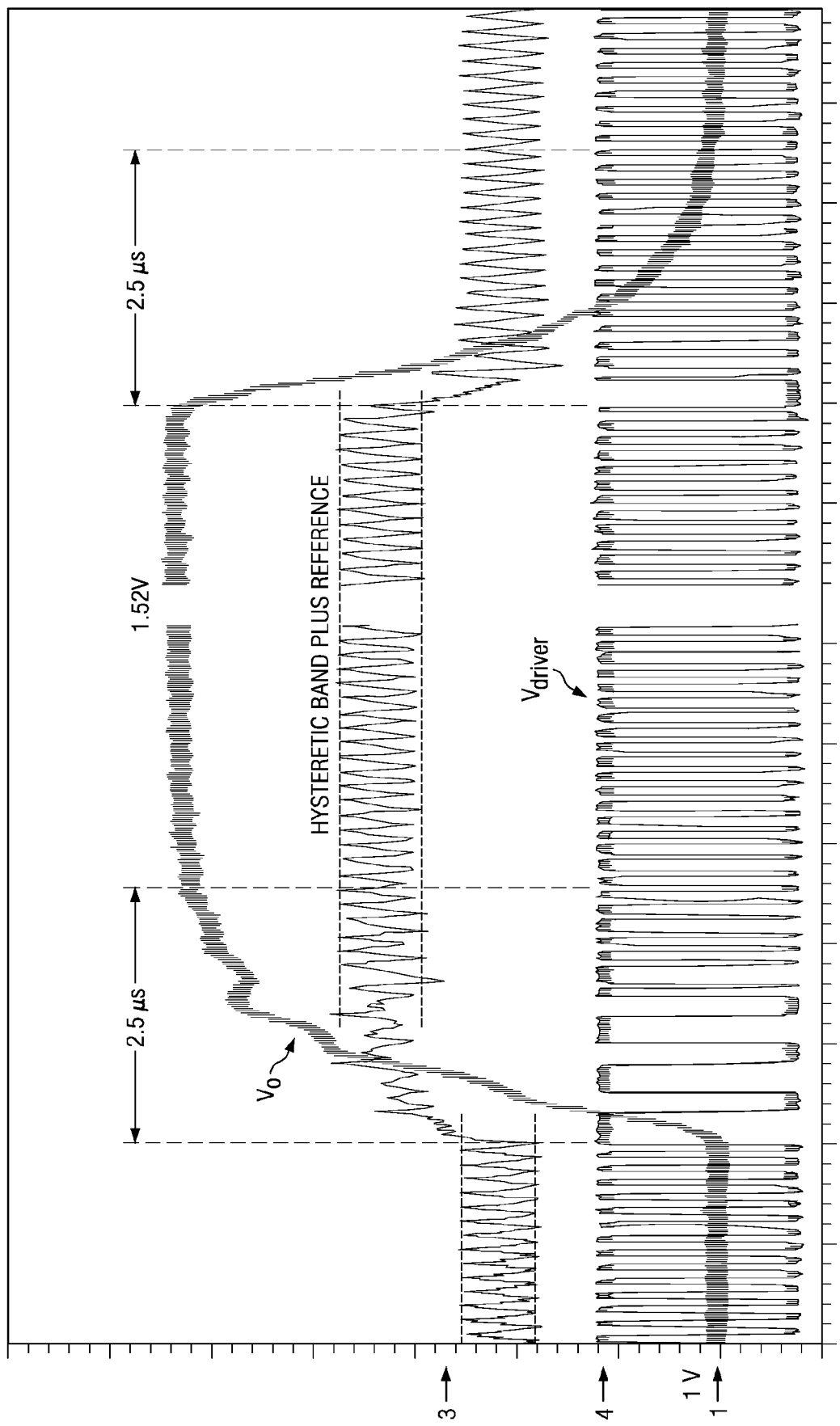
Figure 18:
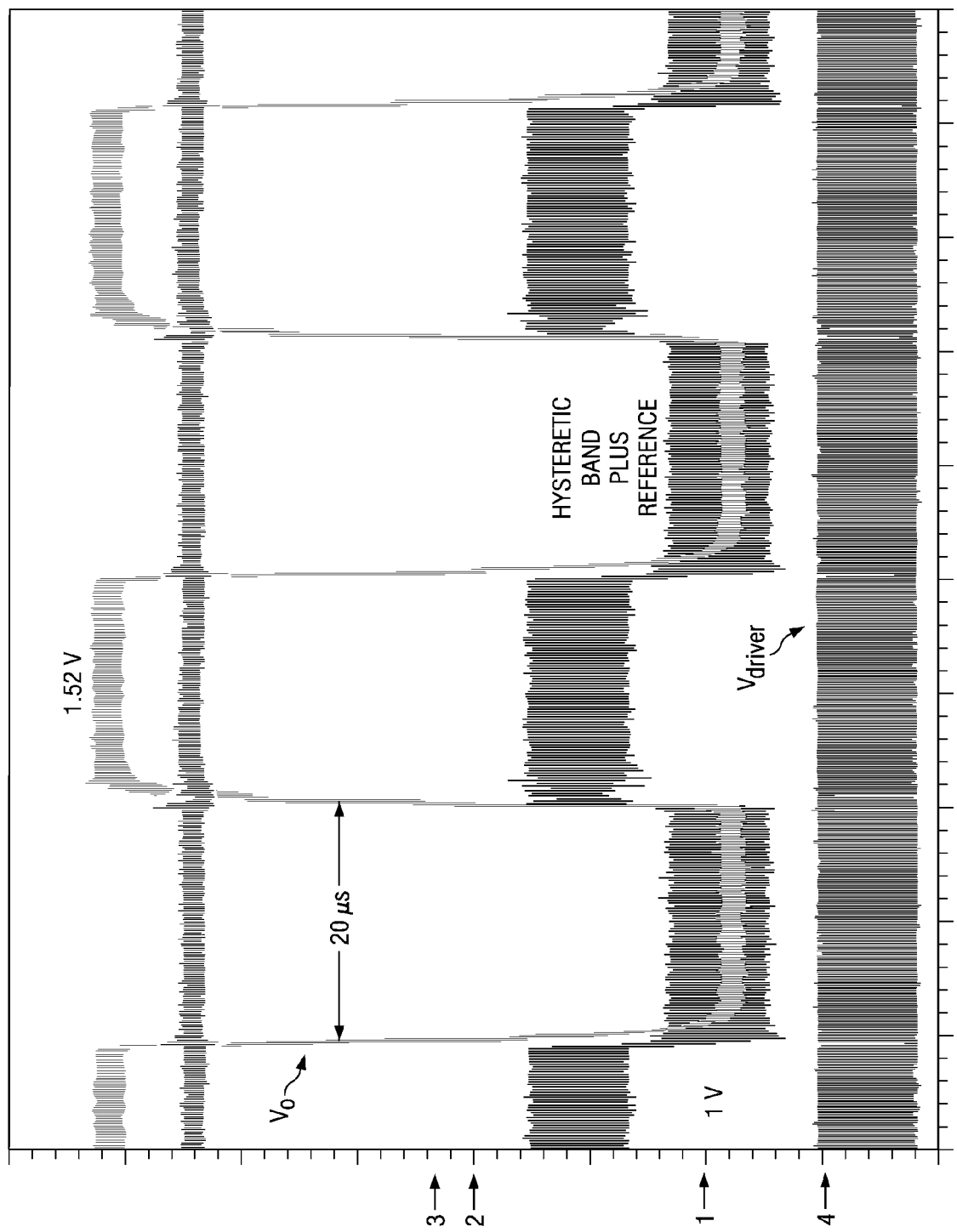

An output voltage tracking of the reference voltage is illustrated in FIGS. 17 and 18. In FIG. 17, the scale is one μs/division along the horizontal time axis, 100 mV/division for output voltage $V_o$, and five A/division for the output capacitor current plus reference voltage. In FIG. 18, the time scale is 10 μs/division along the horizontal time axis, and 100 mV/division for output voltage $V_o$. The transition time, 2.5 μs, is a near minimum-time transition for the power train. The power converter is also capable of performing a 2.5 μs voltage transition every 20 μs, which is extremely fast. FIG. 17 also shows several waveforms including a drive signal $V_{driver}$ for a driver of a power switch and the output capacitor current plus reference voltage. The operative width of the hysteretic band can also be seen in the FIGUREs.

Figure 19:
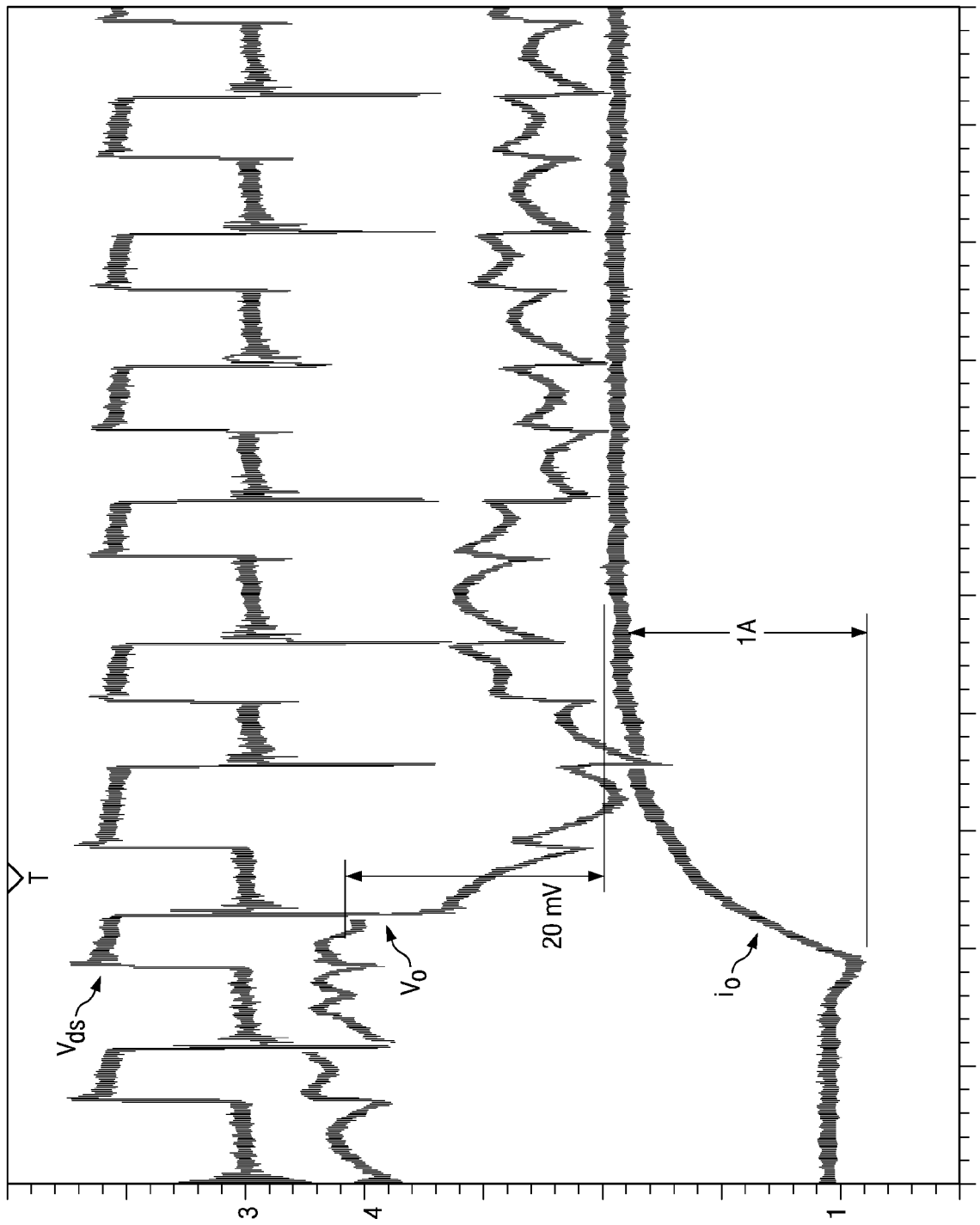

Output voltage regulation for a 10 A/μs load step in output current is shown in FIG. 19. The scale is 200 ns/division along the horizontal time axis, 10 mV/division for output voltage $V_o$, and 0.5 A/division for the output current $I_o$. The waveform designated $V_{ds}$ represents the drain-to-source voltage of a rectifier switch (such as the auxiliary switch $Q_{aux}$ previously described with reference to FIG. 6) in one phase. The dc error in the output voltage $V_o$ is 20 mV since no integration action is employed therewith. The output voltage error comes from the hysteretic band implementation. The control circuits of the controller will not saturate during the transient because the control is faster than the load step and the inductor current is capable of tracking the output current. More aggressive output current steps may saturate the duty cycle, and the tolerance band is still within reach.

Thus, a controller based on nonlinear and linear control circuits have been described to increase the effective bandwidth of a power converter providing advantages over the prior art for both low- and high-frequency power converters. In one embodiment, the controller overcomes the bandwidth limitation for an analog controller due to the switching frequency using a nonlinear control circuit (e.g., an ideal nonlinear control circuit) and a linear control circuit (e.g., a digital linear control circuit). The nonlinear control circuit provides the excellent control response for load and output voltage steps while the linear control circuit provides final regulation accuracy. The digital implementation of the linear control circuit enables a substantially maximum bandwidth therefor (sampling and switching frequencies are equal) and avoids interaction problems with the nonlinear response. The implementation described for the transfer function based on digital integrators is numerically robust at high sampling frequency and employs modest integration resources. The controller can provide a high efficiency, multiphase, power converter that responds to dynamic voltage scaling, and tight output voltage regulation requirement for step changes in the output current. Although the switching frequency is only 500 kHz, the effective control bandwidth is near one MHz.

The controller including feedback of the output capacitor current also overcomes bandwidth limitations due to noise, plant variations, and circuit parasitic elements in a high-frequency power converter. The controller achieves a substantially ideal response for step changes in the output current and near minimum response time for output voltage steps. The inner linear control circuit is stable, robust and provides a fast control response. The outer linear control circuit can be modeled as a first-order system, which can be easily compensated for stability. The controller can provide a high efficiency five MHz (switching frequency) power converter that responds to dynamic voltage scaling and provides tight output voltage regulation for step changes in the output current.

Thus, a controller and related method of controlling a power converter with readily attainable and quantifiable advantages has been introduced. Those skilled in the art should understand that the previously described embodiments of the controller, related method, and a power converter employing the same are submitted for illustrative purposes only and that other embodiments capable of producing a control signal for a power converter providing a fast time response are well within the broad scope of the present invention.

Exemplary embodiments of the present invention have been illustrated with reference to specific electronic components. Those skilled in the art are aware, however, that other components may be substituted (not necessarily with components of the same type) to create desired conditions or accomplish desired results. For instance, multiple components may be substituted for a single component and vice-versa. The principles of the present invention may be applied to a wide variety of power converter topologies.

For a better understanding of power converters see "Modern DC-to-DC Switchmode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). Additionally, for related applications see U.S. Patent Application Publication No. 2005/0169024 (now U.S. Pat. No. 7,038,438), entitled "Controller for a Power Converter and a Method of Controlling a Switch Thereof," to Dwarakanath, et al., U.S. Patent Application Publication No. 2005/0168205 (now U.S. Pat. No. 7,019,505), entitled "Controller for a Power Converter and Method of Controlling a Switch Thereof," to Dwarakanath, et al., U.S. Patent Application Publication No. 2005/0168203 (now U.S. Pat. No. 7,330,017), entitled "Driver for a Power Converter and Method of Driving a Switch Thereof," to Dwarakanath, et al., U.S. Patent Application Publication No. 2005/0167756 (now U.S. Pat. No. 7,230,302), entitled "Laterally Diffused Metal Oxide Semiconductor Device and Method of Forming the Same," to Lotfi, et al., and U.S. Patent Application Publication No. 2006/0038225 (now U.S. Pat. No. 7,015,544), entitled "Integrated Circuit Employable with a Power Converter," to Lotfi, et al. The aforementioned references are incorporated herein by reference in their entirety.

Although the present invention has been described in detail, those skilled in the art should understand that they can make various changes, substitutions, and alterations herein without departing from the spirit and scope of the invention in its broadest form.

What is claimed is:

1. A controller for use with a power converter including a switch configured to conduct to provide a regulated output characteristic at an output of said power converter, comprising:
   a linear control circuit, coupled to said output, configured to provide a first control signal to control a duty cycle and a switching frequency for said switch as a function of said output characteristic; and
   a nonlinear control circuit, coupled to said output, configured to provide a second control signal to control said duty cycle and said switching frequency for said switch as a function of said output characteristic, wherein said controller is configured to select one of said first and second control signals for said switch in response to a change in said output characteristic.

2. The controller as recited in claim 1 wherein said output characteristic is selected from the group consisting of:
   an output voltage of said power converter,
   an output current of said power converter, and
   an output filter capacitor current of said power converter.

3. The controller as recited in claim 1 wherein said controller is configured to select one of said first and second control signals for said switch in response to a change in a set point of said output characteristic.

4. The controller as recited in claim 1 wherein said nonlinear control circuit is configured to provide open loop control for said power converter.

5. The controller as recited in claim 1 wherein said first control signal includes a compensation signal and said nonlinear control circuit is configured to provide a signal to said linear control circuit to modify said compensation signal when said controller transitions control from said nonlinear control circuit to said linear control circuit.

6. The controller as recited in claim 1 wherein said nonlinear control circuit is responsive to an output filter capacitor current using a mirror circuit to provide said second control signal.

7. The controller as recited in claim 1 wherein said nonlinear control circuit includes a lookup table to provide said second control signal.

8. A power converter, comprising:
   a switch that conducts to provide a regulated output characteristic at an output of said power converter; and
   a controller, including:
      a linear control circuit, coupled to said output, that provides a first control signal to control a duty cycle and a switching frequency for said switch as a function of said output characteristic, and
      a nonlinear control circuit, coupled to said output, that provides a second control signal to control said duty cycle and said switching frequency for said switch as a function of said output characteristic, wherein said controller selects one of said first and second control signals for said switch in response to a change in said output characteristic.

9. The power converter as recited in claim 8 wherein said output characteristic is selected from the group consisting of:
   an output voltage of said power converter,
   an output current of said power converter, and
   an output filter capacitor current of said power converter.

10. The power converter as recited in claim 8 wherein said controller is configured to select one of said first and second control signals for said switch in response to a change in a set point of said output characteristic.

11. The power converter as recited in claim 8 wherein said nonlinear control circuit provides open loop control for said power converter.

12. The power converter as recited in claim 8 wherein said first control signal includes a compensation signal and said nonlinear control circuit is configured to provide a signal to said linear control circuit to modify said compensation signal when said controller transitions control from said nonlinear control circuit to said linear control circuit.

13. The power converter as recited in claim 8 wherein said nonlinear control circuit is responsive to an output filter capacitor current using a mirror circuit to provide said second control signal.

14. The power converter as recited in claim 8 wherein said nonlinear control circuit includes a lookup table to provide said second control signal.

15. A method of operating a controller for a power converter including a switch that conducts to provide a regulated output characteristic at an output of said power converter, comprising:
   providing a first control signal to control a duty cycle and a switching frequency for said switch as a function of said output characteristic with a linear control circuit coupled to said output of said power converter;
   providing a second control signal to control said duty cycle and said switching frequency for said switch as a function of said output characteristic with a nonlinear control circuit coupled to said output of said power converter; and
   selecting one of said first and second control signals for said switch in response to a change in said output characteristic.

16. The method as recited in claim 15 wherein said output characteristic is selected from the group consisting of:

an output voltage of said power converter, an output current of said power converter, and an output filter capacitor current of said power converter.

17. The method as recited in claim 15 wherein said selecting comprises selecting one of said first and second control signals for said switch in response to a change in a set point of said output characteristic.

18. The method as recited in claim 15 wherein said nonlinear control circuit provides open loop control for said power converter.

19. The method as recited in claim 15 wherein said first control signal includes a compensation signal and said nonlinear control circuit is configured to provide a signal to said linear control circuit to modify said compensation signal when said controller transitions control from said nonlinear control circuit to said linear control circuit.

20. The method as recited in claim 15 wherein said nonlinear control circuit is responsive to an output filter capacitor current using a mirror circuit to provide said second control signal.

* * * * *